US009664831B2

(12) United States Patent
Nojima

(10) Patent No.: US 9,664,831 B2
(45) Date of Patent: May 30, 2017

(54) NEAR-INFRARED SHIELDING FILM AND NEAR-INFRARED SHIELDING BODY

(71) Applicant: Konica Minolta, Inc., Tokyo (JP)

(72) Inventor: Takahiko Nojima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 421 days.

(21) Appl. No.: 14/351,045

(22) PCT Filed: Oct. 12, 2012

(86) PCT No.: PCT/JP2012/076511
§ 371 (c)(1),
(2) Date: Apr. 10, 2014

(87) PCT Pub. No.: WO2013/054912
PCT Pub. Date: Apr. 18, 2013

(65) Prior Publication Data
US 2014/0233092 A1  Aug. 21, 2014

(30) Foreign Application Priority Data
Oct. 12, 2011  (JP) ................................ 2011-225156

(51) Int. Cl.
| | | |
|---|---|---|
| F21V 9/04 | (2006.01) | |
| F21V 9/06 | (2006.01) | |
| G02B 5/08 | (2006.01) | |
| G02B 5/20 | (2006.01) | |
| G02B 5/28 | (2006.01) | |
| B32B 7/02 | (2006.01) | |
| B32B 27/08 | (2006.01) | |
| B32B 27/20 | (2006.01) | |
| B32B 27/30 | (2006.01) | |

(52) U.S. Cl.
CPC ............... G02B 5/282 (2013.01); B32B 7/02 (2013.01); B32B 27/08 (2013.01); B32B 27/20 (2013.01); B32B 27/306 (2013.01); G02B 5/208 (2013.01); G02B 5/281 (2013.01); B32B 2250/24 (2013.01); B32B 2264/102 (2013.01); B32B 2307/418 (2013.01); B32B 2307/71 (2013.01)

(58) Field of Classification Search
CPC G02B 19/0042; G02B 9/009; G02B 19/0095; G02B 5/0891; G02B 5/208; G02B 5/281; G02B 5/282; G02B 5/283
See application file for complete search history.

(56) References Cited

U.S. PATENT DOCUMENTS

| | | | | |
|---|---|---|---|---|
| 2005/0228112 A1* | 10/2005 | Takahashi | .......... | C01G 23/0532 524/497 |
| 2010/0148135 A1* | 6/2010 | Yokoyama | ........... | C01G 23/047 252/589 |
| 2010/0208349 A1* | 8/2010 | Beer | ........................ | G02B 1/04 359/580 |

FOREIGN PATENT DOCUMENTS

| | | | | |
|---|---|---|---|---|
| CN | 1708559 | | 12/2005 | |
| EP | 1591804 A1 | * | 11/2005 | ............... G02B 1/11 |
| EP | 2138462 A1 | * | 12/2009 | ........... C01G 23/047 |
| JP | 08-110401 A | | 4/1996 | |
| JP | 2002-131531 A | | 5/2002 | |
| JP | 2003-266577 A | | 9/2003 | |
| JP | 2004-123766 A | | 4/2004 | |
| JP | 2004-125822 A | | 4/2004 | |
| JP | 2004-169018 A | | 6/2004 | |
| JP | 2009-086659 A | | 4/2009 | |
| JP | 2009086659 A | * | 4/2009 | |
| JP | 2009-544491 A | | 12/2009 | |
| JP | 2010-053200 A | | 3/2010 | |
| WO | WO 2012/014654 A1 | | 2/2012 | |

OTHER PUBLICATIONS

Tungsten-doped In2O3 transparent conductive films with high transmittance in near-infrared region; Ming Yang, Jiahan Feng, Guifeng Li, Qun Zhang Department of Materials Science, Fudan University, 220 Handan Road, Shanghai 200433, People's Republic of China.*
Extended European Search Report issued Mar. 27, 2015 for the corresponding European Patent Application No. 12839382.4.
International Preliminary Report on Patentability dated Apr. 24, 2014.
Office Action issued Apr. 1, 2015 for the corresponding Chinese Patent Application No. 201280050303.3.
English translation of Office Action issued Apr. 1, 2015 for the corresponding Chinese Patent Application No. 201280050303.3.

* cited by examiner

*Primary Examiner* — Scott J Sugarman
*Assistant Examiner* — Sharrief Broome
(74) *Attorney, Agent, or Firm* — Lucas & Mercanti, LLP

(57) ABSTRACT

To provided a near-infrared shielding film which is excellent in durability and film flexibility and has high visible light transmittance and an excellent near-infrared shielding property, a production method thereof, and a near-infrared shielding body being formed by being provided with the near-infrared shielding film.
The near-infrared shielding film includes an optical interference film formed by alternately laminating a high refractive index layer containing a first water-soluble polymer and first metal oxide particles and a low refractive index layer containing a second water-soluble polymer and second metal oxide particles, on a substrate, in which the first metal oxide particles are particles formed by coating titanium oxide particles with silicon-containing hydrated oxide.

13 Claims, No Drawings

NEAR-INFRARED SHIELDING FILM AND NEAR-INFRARED SHIELDING BODY

CROSS REFERENCE TO RELATED APPLICATION

This Application is a 371 of PCT/JP2012/076511 filed on Oct. 12, 2012 which, in turn, claimed the priority of Japanese Patent Application No. JP2011-225156 filed on Oct. 12, 2011 both applications are incorporated herein by reference.

TECHNICAL FIELD

The present invention relates to a near-infrared shielding film and a near-infrared shielding body.

BACKGROUND ART

In recent years, from the viewpoint of reduction of load applied on air conditioning equipment as part of energy conservation measures, demands are increasing for near-infrared shielding films configured to be pasted on window glasses of buildings and vehicles so as to shield transmission of heat rays of sunlight.

As methods of forming a near-infrared shielding film, dry film-formation methods such as vapor deposition and sputtering are mainly proposed in which a lamination unit, is formed by alternately laminating a high refractive index layer and a low refractive index layer. However, the dry film-formation methods have problems such as need to use a large-sized vacuum apparatus for film-formation, high production cost, difficulty in formation of a film with large area, and restriction on applicable substrates limited to heat-resistant materials.

Recently, studies on methods of forming near-infrared shielding films by wet film-formation methods are actively conducted, instead of the dry film-formation methods having the above-described problems.

As a technique of wet coating methods, for example, Japanese Patent Application Laid-Open (JP-A) No. 2003-266577 discloses a method of alternately laminating using a slurry containing particles of spherical rutile-type titanium oxide dispersed in methanol and a methanol silica sol. Moreover, for example, JP-A No. 2004-123766 discloses a method of forming a transparent laminate by coating a composition for forming a high refractive index coating film which consists of rutile-type titanium oxide, a heterocycle-based nitrogen compound (for example, pyridine), an ultraviolet curable binder, and an organic solvent on a substrate according to a wet coating method using a bar coater. Further, for example, JP-A No. Hei8-110401 discloses a method of forming a transparent laminate including using a coating liquid for a high refractive index layer in which a thermosetting silicone resin or an ultraviolet curable acryl resin containing a metal oxide or microparticles of a metal compound is dispersed in an organic solvent and coating the coating liquid on a substrate according to a wet coating method using a bar coater.

SUMMARY OF INVENTION

Technical Problem

However, in the infrared shielding film provided by the production methods disclosed in JP-A No. 2003-266577 and JP-A No. 2004-123766, since a slurry obtained by dispersing rutile-type titanium oxide particles in an organic solvent using a surface treating agent is used, there are problems not only in that the particle distribution of titanium particles is wide and the refractive index in plane is nonuniform in coating film, but also in that the coating film discolors in the course of long-term storage by influence of the surface treating agent and thus a durability is low. In addition, since the infrared shielding film obtained by the production method disclosed in JP-A No. 2003-266577 is formed by bonding between particles, there are problems in that the obtained film is fragile and the flexibility is poor. Moreover, in the production method disclosed in JP-A No. 2004-123766 or JP-A No. Hei8-110401, since a high refractive index layer is formed by using an ultraviolet curable binder or a thermosetting binder as a binder and then is cured by ultraviolet rays or heat, there is also a problem in that the obtained infrared shielding film has poor flexibility as a coating film property.

The present, invention was made in consideration of the above-described problems, and an object thereof is to provide a near-infrared shielding film which is excellent in durability and film flexibility and has high visible light transmittance and an excellent near-infrared shielding property, a production method thereof, and a near-infrared shielding body being formed by being provided with the near-infrared shielding film.

Solution to Problem

An object of the present invention is attained by the following constitutions.

(1) A near-infrared shielding film including an optical interference film formed by alternately laminating a high refractive index layer containing a first water-soluble polymer and first metal oxide particles and a low refractive index layer containing a second water-soluble polymer and second metal oxide particles, on a substrate, in which the first metal oxide particles are particles formed by coating titanium oxide particles with silicon-containing hydrated oxide.

(2) The near-infrared shielding film described in the above item (1), in which, as a coating amount of the silicon-containing hydrated oxide in the first metal oxide particles, $SiO_2$ is 3 to 30% by mass with respect to the titanium oxide particles.

(3) The near-infrared shielding film described in the above item (1) or (2), in which the first metal oxide particles have an average primary particle diameter of 2 to 31 nm.

(4) The near-infrared shielding film described in any one of the above items (1) to (3), in which the first and the second water-soluble polymers are polyvinyl alcohol.

(5) The near-infrared shielding film described in any one of the above items (1) to (4), in which at least one layer of the high refractive index layer and the low refractive index layer contains at least one of boric acid and a salt thereof, and borax.

(6) The near-infrared shielding film described, in any one of the above items (1) to (5), in which the first metal oxide particles include rutile-type titanium oxide particles.

(7) The near-infrared shielding film described, in any one of the above items (1) to (6), wherein a refractive index difference between the high refractive index layer and the low refractive index layer is 0.3 or more.

(8) A near-infrared shielding body being formed by being provided with the near-infrared shielding film described in any one of the above items (1) to (7) on at least one surface of a substrate.

DESCRIPTION OF EMBODIMENTS

Hereinafter, embodiments for carrying out the present invention will be described in detail.

An embodiment of the present, invention relates to a near-infrared shielding film which includes an optical interference film formed by alternately laminating a high refractive index layer containing a first water-soluble polymer and first, metal oxide particles and a low refractive index layer containing a second water-soluble polymer and second metal oxide particles, on a substrate. In the near-infrared shielding film, the first metal oxide particles are particles formed by coating titanium oxide particles with silicon-containing hydrated oxide.

In the near-infrared shielding film of the present invention, since the surfaces of the first metal oxide particles contained in the high refractive index layer are coated with silicon-containing hydrated oxide, fluidity of the first metal oxide particles is suppressed or prevented by the interaction with the first water-soluble polymer to obtain a film in which interlayer mixing between the high refractive index layer and the low refractive index layer is reduced. Therefore, it is possible to realize a near-infrared shielding film which is excellent in durability and film flexibility and has high visible light transmittance and an excellent near-infrared shielding property.

A mechanism exhibiting a main function effect as a result of the above-described configuration of the present invention is assumed as follows.

That is, the near-infrared shielding film of the present invention is produced with high productivity by coating the respective coating liquids capable of forming the high refractive index layer and the low refractive index layer on units consisting of the respective coating liquids to be a multilayer constitution. Further, when a water-based coating liquid unit is used, it is necessary to secure a refractive index designed for each layer by preventing the mixing of the coating liquid components for each layer of the high refractive index layer and the low refractive index layer as much as possible. To do so, it is important to suppress interlayer mixing caused by diffusion of the metal oxide particles between the high refractive index layer and the low refractive index layer.

In the near-infrared shielding film according to the present invention, the high refractive index layer contains the first water-soluble polymer, and particles formed by coating titanium oxide particles with silicon-containing hydrated oxide as the first, metal oxide particles. Therefore, a network of the first metal oxide particles and the first water-soluble polymer is formed by the interaction between the silicon-containing hydrated oxide on the surfaces of the first metal oxide particles and the first water-soluble polymer. As a result, it is considered that the interlayer mixing between the high refractive index layer and the low refractive index layer is suppressed and desirable near-infrared shielding performance is achieved. In particular, when polyvinyl alcohol is used as the first, water-soluble polymer, a strong hydrogen-bonding network between the respective OH groups of the first metal oxide particles and the polyvinyl alcohol is formed. As a result, the interlayer mixing between the high refractive index layer and the low refractive index layer is suppressed and desirable near-infrared shielding performance is achieved. Further, by the interaction effect and the use of particles formed by coating titanium oxide particles with silicon-containing hydrated oxide as a material of the high refractive index layer, the photocatalytic activity is inhibited. As a result, it is considered that a near-infrared shielding film having excellent durability can be provided even when a temperature and humidity condition is changed. In addition, as for the control of the refractive index of the high refractive index layer, it is considered that the refractive index difference between the high refractive index layer and the low refractive index layer can be controlled effectively by controlling a coating amount of silica. Incidentally, the above-described mechanism is merely inference and the present invention is not limited to the above-described mechanism.

Hereinafter, constitutional elements of the near-infrared shielding film of the present invention and embodiments for carrying out the present invention will be described in detail.

In this specification, "near-infrared" means near-infrared rays with a wavelength of about 750 nm to 2500 nm. The "near-infrared shielding film" of the present, invention is a film capable of shielding all or some of near-infrared rays by reflecting or absorbing near-infrared rays.

{Near-Infrared Shielding Film}

The near-infrared shielding film of the present invention includes a substrate, and an optical interference film formed by alternately laminating a high refractive index layer and a low refractive index layer.

The near-infra red shielding film, of the present invention is not particularly limited as long as it has a multilayered optical interference film formed by alternately laminating a high refractive index layer and a low refractive index layer on one surface or both surfaces of the substrate. From the viewpoint of productivity, the total number of layers of the high refractive index layer and the low refractive index layer per one surface of the substrate is preferably in a range of 100 layers or less and 12 layers or more, more preferably in a range of 45 layers or less and 15 layers or more, and still more preferably 45 layers or less and 21 layers or more. Further, the preferable range of the total number of layers of the high refractive index layer and the low refractive index layer is applicable to a case where layers are laminated on only one surface of the substrate and is also applicable to a case where layers are simultaneously laminated on both surfaces of the substrate. In a case where layers are laminated on both surfaces of the substrate, the total number of layers of the high refractive index layer and the low refractive index layer on one surface of the substrate and the total number thereof on the other surface of the substrate may be the same or different to each other. Moreover, in the near-infrared shielding film of the present invention, a lowermost layer (i.e. a layer which comes into contact with the substrate) and an outermost layer may be any one of the high refractive index layer and the low refractive index layer. However, by employing a layer configuration in which the low refractive index layers are located at the lowermost layer and the outermost layer, adhesiveness of the lowermost layer to the substrate, blowing resistance of the outermost layer, and excellent coatability and adhesiveness of a hard coat layer to the outermost layer can be achieved. From the viewpoints of these, the near-infrared shielding film of the present invention preferably has a layer configuration in which the lowermost layer and the outermost layer are low refractive index layers.

In general, for the near-infrared shielding film, it is preferable to design to have a large difference in refractive index between the high refractive index layer and the low refractive index layer from the viewpoint of the fact that the near-infrared reflectance can be increased with a small number of layers. In the present invention, the refractive index difference between the high refractive index layer and the low refractive index layer adjacent to each other is preferably 0.1 or more, more preferably 0.25 or more, still more preferably 0.3 or more, further still more preferably 0.35 or more, and most preferably 0.4 or more.

The refractive index difference and required number of layers can be calculated by using a commercially available software for optical design. For examples, in order to obtain the near-infrared reflectance of 90% or more, lamination of 200 or more layers is needed if the refractive index difference is less than 0.1, which yields not only lower productivity but also lower transparency due to higher scattering at lamination interface and in some cases, it is also very difficult to perform production without failures.

In a case where the near-infrared shielding film is formed by alternately laminating the high refractive index layer and the low refractive index layer, it is preferable that the refractive index difference between the high refractive index layer and the low refractive index layer is within the above-described preferable range of the refractive index difference. However, for example, in a case where the outermost layer is formed as a layer for protecting a film or a case where the lowermost, layer is formed as a layer for improving adhesiveness with respect to the substrate, the outermost layer or the lowermost layer may have a configuration in which the refractive index difference is out of the above-described preferable range.

Moreover, with regard to optical characteristics of the near-infrared shielding film of the present invention, a transmittance of the visible light region, prescribed in JIS R3106-1998, is 50% or more, preferably 75% or more, and more preferably 85% or more. Further, it is preferable to have a region with a reflectance of more than 50% in a region with a wavelength of 900 nm to 1,400 nm.

The total thickness of the near-infrared shielding film of the present invention is preferably 12 µm to 315 µm, more preferably 15 µm to 200 µm, still more preferably 20 µm to 100 µm.

Next, with regard to the high refractive index layer, the low refractive index layer, and the substrate which are constitutional elements of the near-infrared shielding film of the present invention, components included in each element, and the like will be described sequentially.

<High Refractive Index Layer>

The high refractive index layer according to the present invention includes a first water-soluble polymer and first metal oxide particles as essential components, and if needed, may further include at least one selected from the group consisting of a curing agent, a surface coating component, a surfactant, and various additives.

The refractive index of the high refractive index layer according to the present invention is preferably 1.80 to 2.50, and more preferably 1.90 to 2.20.

The thickness per one layer of the high refractive index layer according to the present invention is preferably 20 to 800 nm, and more preferably 50 to 350 nm.

Herein, when the thickness per one layer is measured, the high refractive index layer and the low refractive index layer may have a specific interface or a gradually changing interface therebetween. In a case where the interface gradually changes, respective layers are mixed. Therefore, when it is assumed that "maximum refractive index−minimum refractive index=Δn" in a region in which the refractive index continuously changes, the point of "minimum refractive index between two layers+Δn/2" is regarded as the interface between layers. Moreover, the same is also true of the thickness of the low refractive index layer to be described later.

The metal oxide concentration profile in the laminated film, which is the optical interference film formed by alternately laminating the high refractive index layer and the low refractive index layer of the present invention, can be observed by performing etching by using a sputtering method in the depth direction from the surface, performing the sputtering using an XPS surface analyzer while the outermost surface is 0 nm and the speed is 0.5 nm/min, and measuring an atomic composition ratio. Further, the metal oxide concentration profile may be observed, by cutting the laminated film and measuring an atomic composition ratio of the cross-section using an XPS surface analyzer. In a case where the concentration of the metal oxide discontinuously changes in the mixed region, a boundary may be confirmed through a cross-sectional photograph by an electron microscope (transmission electron microscope; TEM.).

With regard to an XPS surface analyzer, any type of an instrument, can be used, without particular limitation. However, ESCALAB-200R manufactured by VG Scientifics Co., Ltd. was used. Mg is used as an X ray anode and the measurement is made at an output of 600 W (an acceleration voltage of 15 kV and an emission electric current of 40 mA).

[First Metal Oxide Particles]

The first metal oxide particles according to the present invention are particles formed by coating titanium oxide particles with silicon-containing hydrated oxide. In the present invention, titanium oxide particles mean titanium dioxide ($TiO_2$) particles.

Herein, the term "coating" means a state where silicon-containing hydrated oxide is attached to at least, some of surfaces of titanium oxide particles. In other words, surfaces of titanium oxide particles used as the first metal oxide particles according to the present, invention may be completely coated with silicon-containing hydrated oxide or some of surfaces of titanium oxide particles may be coated with silicon-containing hydrated oxide. From the viewpoint of controlling the refractive index of the coated, titanium oxide particles by the coating amount of silicon-containing hydrated oxide, it is preferable that some of surfaces of titanium oxide particles be coated with silicon-containing hydrated oxide.

In the present invention, as the first metal oxide particles, rutile-type titanium oxide particles coated with silicon-containing hydrated oxide, anatase-type titanium oxide particles coated with silicon-containing hydrated oxide, or mixed particles thereof may be used. Among these, rutile-type titanium oxide particles coated with silicon-containing hydrated oxide is more preferably used.

The reason is that, since the rutile-type titanium oxide particles have a lower photocatalytic activity than the anatase-type titanium oxide particles, the weather resistance of the high refractive index layer and the adjacent low refractive index layer is enhanced and the refractive index thereof is increased.

As for an aqueous solution containing titanium oxide particles used for the first metal oxide particles according to the present invention, it is possible to use those obtained by hydrophobicizing the surface of a water-based titanium oxide sol, which has a pH of 1.0 to 3.0 and includes titanium particles with a positive zeta potential, so as to be in an organic solvent-dispersible state.

The content of the first metal oxide particles in the high refractive index layer according to the present invention is preferably 15 to 95% by mass, more preferably 20 to 88% by mass, and still more preferably 30 to 85% by mass, with respect to 100% by mass of the solid content of the high refractive index layer.

When the content of the first metal oxide particles is 15 to 95% by mass with respect to 100% by mass of the solid content of the high refractive index layer, a refractive index difference between the high refractive index layer and the low refractive index layer can be increased, which is preferable.

The particle diameters of the titanium oxide particles and the first metal oxide particles (titanium oxide particles coated with silicon-containing hydrated oxide) can be obtained from a volume average particle diameter or an average primary particle diameter.

The particle diameters of the first, metal oxide particles according to the present invention and the titanium oxide particles used for the first metal oxide particles can be obtained from a volume average particle diameter or an average primary particle diameter.

In the present invention, the volume average particle diameter of the titanium oxide particles (titanium oxide particles which are not coated with silicon-containing hydrated oxide) used for the first, metal oxide particles is preferably 30 nm or less, more preferably 1 to 30 nm, still more preferably 5 to 15 nm, and most preferably 6 to 10 nm. The volume average particle diameter is preferably 1 nm or more and 30 nm or less, from the viewpoint of excellent visible light transmission as having low haze.

The volume average particle diameter of the titanium oxide particles used for the first metal oxide particles according to the present, invention may be determined in the following ways. The particle diameter of 1,000 arbitrary particles is measured by a laser diffraction scattering method, a dynamic light scattering method, a method of observing particles through an electron microscope, or a method of observing the images of particles appearing on a cross section or surface of a refractive index layer through an electron microscope. From the measurement results, a group of metal oxide particles is formed such that particles with particle diameters of d1, d2 . . . di . . . dk exist by n1, n2 . . . ni . . . nk, respectively in number. In the group, in the case where a volume per one particle is represented with vi, the above volume average particle diameter is an average particle diameter which is represented by the formula "volume average particle diameter $mv=\{\Sigma(vi \cdot di)\}/\{\Sigma(vi)\}$" and weighted with volume.

Further, it is preferable that titanium oxide particles used for the first, metal oxide particles according to the present invention be monodispersity. Herein, the monodispersity means that the degree of monodispersity obtained by the following formula is 40% or less. The degree of monodispersity is more preferably 30% or less, and particularly preferably 0.1 to 20%.

Degree of monodispersity=(Standard deviation obtained from distribution of volume particle diameters)/(volume average particle diameter)× 100 [Equation 1]

When the titanium oxide particles coated with silica-containing hydrated oxide are contained in the high refractive index layer, the present invention exhibits an effect of suppressing the inter layer mixing between the high, refractive index layer and the low refractive index layer by the interaction between the silicon-containing hydrated oxide and the first water-soluble polymer and an effect of preventing a problem such as deterioration of a water-soluble polymer or chalking caused by the photocatalytic activity of titanium oxide particles when not only the rutile-type titanium oxide particles but also the anatase-type titanium oxide particles are used.

The volume average particle diameter of the first metal oxide particles according to the present invention is preferably 2 to 31 nm, more preferably 6 to 16 nm, and still more preferably 7 to 11 nm. When the volume average particle diameter of the first metal oxide particles according to the present invention is 2 to 31 nm, it is preferable from the viewpoints of a near-infrared shielding property that is an effect of the present invention, and optical characteristics such as transparency or haze.

The average primary particle diameter of titanium oxide particles (titanium oxide particles which are not coated with silicon-containing hydrated oxide) used for the first metal oxide particles is preferably 30 nm or less, more preferably 1 to 30 nm, still more preferably 1 to 20 nm, and most preferably 1 to 10 nm. The average primary particle diameter is preferably 1 nm or more and 30 nm or less, from the viewpoint of excellent visible light, transmission as having low haze.

The average primary particle diameter of the first metal oxide particles according to the present invention is preferably 2 to 31 nm, more preferably 2 to 21 nm, and still more preferably 2 to 11 nm. It is preferable that the average primary particle diameter of the first metal oxide particles according to the present invention be 2 to 31 nm, from the viewpoints of a near-infrared shielding property that is an effect of the present invention, and optical characteristics such as transparency or haze.

Incidentally, the average primary particle diameter in this specification can be measured through electron microscope photograph obtained by a transmission electron microscope (TEM) or the like. The average primary particle diameter may be measured by a particle size distribution measuring instrument, using a dynamic light scattering method, a static light scattering method, or the like.

In the case of using a transmission electron microscope, the average particle diameter of the primary particles is measured by observing the particles themselves or the particles exposed on a cross-section or surface of the refractive index layer under an electron microscope, measuring the particle diameters of 1000 arbitrary particles, and obtaining a simple average value thereof (number average value). Herein, the particle diameter of each particle represents a diameter of a circle assumed to be the same as the reflected area.

As a method of producing the first, metal oxide particles according to the present invention, well-known methods may be employed, for example, methods (i) to (v) to be described below may be used.

(i) A method in which titanium oxide having an average particle diameter of 1 to 30 nm is obtained by thermal hydrolysis of an aqueous solution containing titanium oxide particles or by adding alkali to an aqueous solution containing titanium oxide particles and neutralizing the resultant mixture; a slurry, which is obtained by mixing the titanium oxide particles and a mineral acid to make a molar ratio of titanium oxide particles/mineral acid become in a range of 1/0.5 to ½, is subjected to a heating treatment at 50° C. or higher and a temperature equal to or lower than a boiling point of the slurry, a silicon compound (for example, an aqueous solution of sodium silicate) is added in the obtained slurry containing titanium oxide particles; a surface treatment is performed by precipitating aqueous silicon oxide on the surfaces of titanium oxide particles; and then impurities are removed from the obtained slurry of the surface-treated titanium oxide particles (a method described in JP-A No. Hei10-158015).

(ii) A method in which a titanium oxide sol, which is stabilized by pH of an acid region obtained by a deflocculation treatment of titanium, oxide, such as aqueous titanium oxide, using a monobasic acid or a salt thereof, and alkyl silicate as a dispersion stabilizer are mixed by an ordinary method and then the resultant mixture is neutralized (a method described in JP-A No. 2000-053421).

(iii) A method in which, while hydrogen peroxide and metal tin are held in a $H_2O_2/Sn$ molar ratio of 2 to 3, they are simultaneously or alternately added to an aqueous solution of a mixture such as a titanium salt (for example, titanium tetrachloride) to generate an aqueous solution of basic salt, containing titanium, the aqueous solution of basic salt is held at a temperature of 50 to 100° C. over 0.1 to 100 hours to generate an aggregate of composite collide containing titanium oxide, and then an electrolyte in a slurry of the aggregate is removed to prepare a stable aqueous sol of composite collide particles containing titanium oxide; meanwhile, an aqueous solution containing a silicate (for example, an aqueous solution of sodium silicate) or the like is prepared, and cation present in the aqueous solution is removed to prepare a stable aqueous sol of composite collide particles containing silicon dioxide; and 100 parts by mass of the obtained composite aqueous sol containing titanium oxide (when converted to metal oxide ($TiO_2$)) and 2 to 100 parts by mass of the obtained composite aqueous sol containing silicon dioxide (when converted to metal oxide ($SiO_2$)) are mixed, anion in the resultant mixture is removed, followed by heating and aging at 80° C. for one hour (a method described in JP-A No. 2000-063119).

(iv) A method in which hydrogen peroxide is added to a gel or sol of aqueous titanic acid to dissolve aqueous titanic acid; a silicon compound or the like is added to the obtained aqueous solution of peroxo titanic acid; the resultant mixture is heated to obtain a dispersion liquid of core particles consisting of a composite solid solution oxide having a rutile-type structure; then a silicon compound or the like is added to the dispersion liquid of core particles; the resultant mixture is heated to form a coating layer on the surfaces of the core particles; a sol in which composite oxide particles are dispersed is obtained; and the obtained sol is further heated (a method described in JP-A No. 2000-204301).

(v) A method in which organoalkoxysilane ($R^1nSiX_{4-n}$) as a stabilizer or a compound selected from hydrogen peroxide and aliphatic or aromatic hydroxycarboxylic acid is added to hydrosol of titanium oxide obtained by deflocculating aqueous titanium oxide; and pH of the solution is adjusted to 3 or more and less than 9, followed by being subjected to aging and then a desalination treatment (a method described in Japanese Patent No. 4,550,753).

The first metal oxide particles according to the present invention can be produced by the above-described methods (i) to (v). A coating amount of silicon-containing hydrated oxide of titanium oxide particles, which are used as the first metal oxide particles according to the present invention, can be adjusted by the following methods: for example, (1) a method for adjusting a coating amount of silicon-containing hydrated oxide by adjusting an addition amount of a silicon compound with respect to titanium oxide particles to be used, in the above-described methods (i) and (iv); (2) a method for adjusting a coating amount of silicon-containing hydrated oxide by converting the obtained composite aqueous sol containing titanium oxide and a composite aqueous sol containing silicon dioxide into metal oxides ($TiO_2$ and $SiO_2$), respectively, and adjusting the corresponding $SiO_2$ amount with respect to the corresponding $TiO_2$, in the above-described method (iii); (3) a method for adjusting a coating amount of silicon-containing hydrated oxide by adjusting an addition amount of organoalkoxysilane to be used, in the above-described method (v); and (4) a method for adjusting an addition amount of alkyl silicate, in the above-described method (ii).

As for a suspension containing titanium oxide particles coated with silicon-containing hydrated oxide when the first metal oxide particles according to the present invention are prepared, the solid content of the first metal oxide particles is preferably 1 to 40% by mass with respect to 100% by mass of the total solid content of the suspension. Moreover, the solid content is more preferably 15 to 25% by mass. The reason is that when the solid content is 1% by mass or more, the solid content concentration becomes high so as to reduce evaporation load of the solvent and productivity can be improved, and when the solid content is 40% by mass or less, aggregation caused by polymer density can be prevented and defects during coating can be reduced. When the first metal oxide particles according to the present invention is prepared, a pH range of the suspension, which contains titanium oxide particles coated with silicon-containing hydrated oxide, is preferably 3 to 9, and more preferably 4 to 8. The reason is that when pH of the suspension is 9 or less, change in a volume average particle diameter due to alkali dissolution can be suppressed, and when pH of the suspension is 3 or more, handling ability can be improved.

As a coating amount of the silicon-containing hydrated oxide in the first metal oxide particles according to the present invention, $SiO_2$ is preferably 3 to 30% by mass, more preferably 3 to 10% by mass, still more preferably 3 to 8% by mass with respect to the titanium oxide particles. When the coating amount is 3 to 30% by mass, the refractive index of the high refractive index layer is increased easily and the coated particles can be formed stably.

The "silicon-containing hydrated oxide" in this specification may be any one of a hydrate of an inorganic silicon compound, a hydrolysis and/or condensate of an organic silicon compound, but it is more preferable to include a silanol group in order to attain an effect, of the present invention.

The high refractive index layer according to present invention may contain metal oxide particles other than the first metal oxide particles according to the present invention. In a case where other metal oxide particles are used in combination with the first metal oxide particles, various ionic dispersants or protective agents may be used for the purpose of preventing other metal oxide particles and the first metal oxide particles according to the present invention from chargedly aggregating with each other. Examples of the metal oxide particles which can be used in addition to the first metal oxide particles according to the present invention include titanium dioxide, zirconium oxide, zinc oxide, synthetic amorphous silica, colloidal silica, alumina, colloidal alumina, lead titanate, minium, chrome yellow, zinc chrome, chromium oxide, ferric oxide, iron black, copper oxide, magnesium oxide, magnesium hydroxide, strontium titanate, yttrium oxide, niobium oxide, europium oxide, lanthanum oxide, zircon, and tin oxide. When the above-described metal oxide particles other than the first metal oxide particles are contained in the high refractive index layer, the content of the other metal oxide particles is not particularly limited as long as it is within a range in which an effect of the present invention can be exhibited.

In a case where the near-infrared shielding film of the present invention include a plurality of high refractive index layers, it is preferable that the first metal oxide particles formed by coating titanium oxide particles with silicon-containing hydrated oxide be contained in at least one layer of the plurality of high refractive index layers. It is particularly preferable that the first metal oxide particles according to the present invention be contained in all of the plurality of high refractive index layers. In a case where the near-infrared shielding film of the present invention includes one high refractive index layer, it is preferable that the first metal oxide particles according to the present invention be contained in the one high refractive index layer.

[First Water-Soluble Polymer]

In the present invention, a water-soluble polymer, which functions as a binder, is contained in each high refractive index layer and each low refractive index layer. The water-soluble polymer contained in each high refractive index layer is referred to as the first water-soluble polymer, and the water-soluble polymer contained in each low refractive index layer is referred to as the second water-soluble polymer. In the present invention, the first water-soluble polymer and the second water-soluble polymer may have the same constitutional component or a different constitutional component to each other. However, it is more preferable that the first water-soluble polymer and the second water-soluble polymer have a different constitutional component to each other.

The first water-soluble polymer or the second water-soluble polymer, which will be described later, according to the present, invention means that, when the water-soluble polymer is dissolved in water with a concentration of 0.5% by mass at a temperature at which the largest quantity of the water soluble polymer can be dissolved, a mass of an insoluble matter separated by filtration at the time of filtration with a G2 glass filter (maximum fine pore of 40 to 50 μm) is 50% by mass or less of the added water-soluble polymer.

Examples of the first water-soluble polymer according to the present invention include a polymer having a reactive functional group, gelatin, or thickening polysaccharides. These first water-soluble polymers may be used singly or in combinations of two or more types thereof. Moreover, synthesized product or a commercially available product may be used as the first water-soluble polymer. Hereinafter, the first water-soluble polymer according to the present invention will be described in detail.

(Polymer Having Reactive Functional Group)

Examples of the polymer having a reactive functional group used in the present, invention include acrylic resins such as polyvinyl alcohols, polyvinyl pyrrolidines, polyacrylic acid, an acrylic acid-acrylic nitrile copolymer, a potassium acrylate-acrylic nitrile copolymer, a vinyl acetate-acrylic acid ester copolymer, or an acrylic acid-acrylic acid ester copolymer; styrene acrylic acid resins such as a styrene-acrylic acid copolymer, a styrene-methacrylic acid copolymer, a styrene-methacrylic acid-acrylic acid ester copolymer, a styrene-α-methylstyrene-acrylic acid copolymer, or a styrene-α-methylstyrene-acrylic acid-acrylic acid ester copolymer; vinyl acetate based copolymers such as a styrene-sodium styrenesulfonate copolymer, a styrene-2-hydroxyethyl acrylate copolymer, a styrene-2-hydroxyethyl acrylate-styrene sulfonic acid potassium copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleic acid ester copolymer, a vinyl acetate-crotonic acid copolymer, or a vinyl acetate-acrylic acid copolymer; and salts thereof. Among these, polyvinyl alcohol is particularly preferably used in the present invention. Hereinafter, the description of polyvinyl alcohol will be made.

Examples of the polyvinyl alcohol preferably used in the present invention also include various modified polyvinyl alcohols in addition to ordinary polyvinyl alcohol obtained through hydrolysis of polyvinyl acetate.

The polyvinyl alcohol obtained through hydrolysis of polyvinyl acetate has preferably an average degree of polymerization of 1,000 or more, and particularly preferably an average degree of polymerization of 1,500 to 5,000. Further, the degree of saponification is preferably 70 to 100%, and particularly preferably 80 to 99.5%.

Examples of anionically-modified polyvinyl alcohol include polyvinyl alcohol having an anionic group as described in JP-A No. Hei1-206088, a copolymer of vinyl alcohol and a vinyl compound having a water-soluble group as described in JP-A No. Sho61-237681 and Sho63-307979, and modified polyvinyl alcohol having a water-soluble group as described in JP-A No. Hei7-285265.

Further, examples of nonionically-modified polyvinyl alcohol include a polyvinyl alcohol derivative in which a polyalkylene oxide group is added to a part of polyvinyl alcohol as described in JP-A No, Hei7-9758, and a block copolymer of a vinyl compound having a hydrophobic group and vinyl alcohol as described in JP-A No. Hei8-25795. Two or more kinds of polyvinyl alcohols different in the degree of polymerization and types of modification may be used in combination.

Examples of cationically-modified polyvinyl alcohol include polyvinyl alcohol as described in JP-A No. Sho61-10483 which has primary to tertiary amino groups or a quaternary ammonium group on the main chain or the side chain of the polyvinyl alcohol, and the cationically-modified polyvinyl alcohol can be obtained through saponification of a copolymer of an ethylenically-unsaturated monomer having a cationic group and vinyl acetate.

Examples of the ethylenically-unsaturated monomer having a cationic group include trimethyl-(2-acrylamide-2,2-dimethylethyl)ammonium chloride, trimethyl-(3-acrylamide-3,3-dimethylpropyl)ammonium chloride, N-vinylimidazole, N-vinyl-2-methylimidazole, N-(3-dimethylaminopropyl)methacrylamide, hydroxyl ethyl trimethyl ammonium chloride, trimethyl-(2-methacrylamide propyl)ammonium chloride, N-(1,1-dimethyl-3-dimethylaminopropyl)acrylamide, and the like. In the cationically-modified polyvinyl alcohol, a ratio of a cationically-modified group-containing monomer to vinyl acetate is 0.1 to 10 mol %, and preferably 0.2 to 5 mol %.

(Gelatin)

As gelatins applicable to the present invention, various gelatins having been conventionally widely used in the silver halide photosensitive material field may be applicable. Examples of the gelatins include, in addition to acid-treated gelatin and alkali-treated gelatin, enzyme-treated gelatin which is subjected to an enzyme treatment in the production process of gelatin, and gelatin derivative, that is, modified gelatin which has an amino group, an imino group, a hydroxyl group and a carboxyl group as a functional group in its molecule and is modified with a reagent having a group capable of reacting with the above groups. The general production methods of gelatin are known well, and may be referred to, for example, Item 55 in Fourth Edition of The Theory of Photographic Process by T. H. James 1977 (Macmillan), Items 72 to 75 in Science Photograph Manual (Upper part) published by Maruzen Co., Ltd., pages 119 to 124 in Basic Silver-halide Photography of Photographing Engineering published by CORONA PUBLISHING CO., LTD. Further, the reference may be made to "gelatin" described in Item IX, Vol. 176, No. 17643 (December, 1978) in Research Disclosure.

Hardening Agent of Gelatin

When a gelatin is used, a hardening agent of the gelatin may be added if needed.

As the usable hardening agent, the well-known compounds used as a hardening agent of usual photographic emulsion layers may be employed. Examples of the hardening agent include organic hardening agents such as vinyl sulfone compounds, urea-formalin condensates, melanin-formalin condensates, epoxy-based compounds, aziridine-based compounds, active olefins, and isocyanate-based compounds; and inorganic polyvalent, metal salts such as chromium, aluminum, and zirconium.

(Celluloses)

As usable celluloses in the present invention, water-soluble cellulose derivates may be preferably used, and examples thereof may include water-soluble cellulose derivates such as carboxymethyl cellulose (cellulose carboxy methyl ether), methyl cellulose, hydroxymethyl cellulose, hydroxyethyl cellulose, and hydroxy-propyl cellulose; carboxylic acid group-containing celluloses, such as carboxymethyl cellulose (cellulose carboxy methyl ether); and carboxyethyl cellulose. In addition, cellulose derivates such as cellulose nitrate, cellulose acetate propionate, cellulose acetate, and cellulose sulfate ester may be exemplified.

(Thickening Polysaccharides)

The thickening polysaccharides usable in the present invention are not particularly limited, and examples of the thickening polysaccharides include natural simple polysaccharides, natural composite polysaccarides, synthetic simple polysaccharides, and synthetic composite polysaccharides, which are generally known. The details of these polysaccharides may be referred to "Biochemistry Encyclopedia (the second edition) published by Tokyo Kagaku Dojin Co., Ltd.", and 21 page and the like of Volume 31st (1988) in "Food Industry".

The thickening polysaccharides used in the present invention means the polymer of sugars, has a large number of hydrogen-bond groups in its molecule, and has characteristics to have a large viscosity difference between a viscosity at the time of low temperature and a viscosity at the time of high temperature due to a difference in hydrogen bonding strengths between molecules depending on a temperature. Further, by adding metal oxide particles, viscosity increase, which may be caused by hydrogen bonding with the metal oxide particles at the time of low temperature, is caused. The polysaccharides have a viscosity increasing ability such that the addition of the polysaccharides increases a viscosity at 15° C. by 1.0 mPa·s or more, preferably 5.0 mPa·s or more, and more preferably 10.0 mPa·s or more.

Examples of the thickening polysaccharides applicable to the present invention include galactans (for example, agarose and agaropectin), galactomannoglycan (for example, locust bean gum and guaran), xyloglucan (for example, tamarind gum), glucomannoglycan (for example, konjac mannan, wood origin glucomannan, and xanthan gum), galactoglucomannoglycan (for example, needle-leaf tree material origin glycan), arabinogalactoglycan (for example, soybean origin glycan and microorganism origin glycan), glucornamnoglycan (for example, gellan gum), glycosaminoglycans (for example, hyaluronic acid and keratan sulfate), alginic acid and alginate, and natural polymer polysaccharides originating from red algae, such as agar, κ-carrageenan, λ-carrageenan, ι-carrageenan, and furcelleran. From the viewpoints of the characteristic not to lower the dispersion stability of metal oxide particles coexisting in a coating liquid, the constitutional unit of the thickening polysaccharides preferably does not have a carboxylic acid group and a sulfonic acid group. Preferable examples of such thickening polysaccharides include polysaccharides consisting of only pentose, such as L-arabinose, D-ribose, 2-deoxyribose, and D-xylose; or hexose, such as D-glucose, D-fructose, D-mannose, and D-galactose. Specifically, preferably usable examples include tamarind seed gum which is known as xyloglucan including glucose in a main chain and glucose also in a side chain; guar gum, cationized guar gum, hydroxy propyl guar gum, locust bean gum, and tara gum, which are known as galactomannan including mannose in a main chain and glucose in a side chain; and arabinogalactan which includes galactose in a main chain and arabinose in a side chain. In the present invention, tamarind, guar gum, cationized guar gum, and hydroxy propyl guar gum are particularly preferable.

In the present invention, furthermore, two or more kinds of thickening polysaccharides may be used in combination.

Among these, polyvinyl alcohol is preferably used as the first water-soluble polymer. When polyvinyl alcohol is used, other water-soluble polymers may be used in combination with polyvinyl alcohol. At this time, the content of the other water-soluble polymers used in combination may be 0.5 to 10% by mass with respect to 100% by mass of the solid content of the high refractive index layer.

The weight-average molecular weight of the first water-soluble polymer according to the present invention is preferably 1,000 or more and 200,000 or less, and more preferably 3,000 or more and 40,000 or less. The weight-average molecular weight in the present invention can be measured by well-known methods such as a static light scattering method, a gel permeation chromatography (GPC) method, and TOFMASS. In the present invention, the weight-average molecular weight is measured by a gel permeation chromatography method (GPC method) which is a generally well-known method.

In the present invention, the first water-soluble polymer is contained preferably in a range of 5.0% by mass or more and 50% by mass or less, and more preferably in a range of 10% by mass or more and 40% by mass or less, with respect to 100% by mass of the solid content of the high refractive index layer. However, in a case where the first water-soluble polymer is used, in combination, for example, with an emulsion resin, the first water-soluble polymer may be contained in 3.0% by mass or more. If the content of the water-soluble polymer is small, at the time of drying of a coated refractive index layer, the tendency to cause disturbance of the film surface and deterioration of transparency becomes large. On the other hand, if the content of the water-soluble polymer is 50% by mass or less, the relative content of metal oxide becomes appropriate, and it becomes easy to enlarge a refractive index difference between a high refractive index layer and a low refractive index layer.

[Curing Agent]

In the present invention, in order to cure the water-soluble polymer as a binder, a curing agent may be also used. As a curing agent which can be used in combination with the first water-soluble polymer, there is no limitation in particular as long as it is cured by reacting with the water-soluble polymer. For example, when polyvinyl alcohol is used as the first water-soluble polymer, boric acid and a salt thereof are preferably used as a curing agent. In addition to boric acid and a salt thereof, other well-known compounds can be used which generally has a group which can react with polyvinyl alcohol or which promotes the reaction of different groups in the polyvinyl alcohol, and the compounds are selected and used suitably. Specific examples of the curing agent include an epoxy-based curing agent, (such as diglycidyl ethylether, ethylene glycol diglycidyl ether, 1,4-butanediol diglycidyl ether, 1,6-diglycidyl cyclohexane, N,N-diglycidyl-4-glycidyloxy aniline, sorbitol polyglycidyl ether, and glycerol polyglycidyl ether), an aldehyde-based curing agent (such as formaldehyde, and glyoxal), an active halogen-based curing agent (such as 2,4-dichloro-4-hydroxy-1,3,5-s-triazine), an active vinyl-based compound (such as 1,3,5-trisacryloyl-hexahydro-s-triazine and bisvinyl sulfonyl methyl ether), aluminum alum, and borax.

Boric acid or a salt thereof means oxygen acid which uses a boron atom as a central atom, and a salt thereof. Specifically, orthoboric acid, diboric acid, metaboric acid, tetraboric acid, pentaboric acid, octaboric acid, and salts thereof are exemplified.

As a curing agent, the boric acid having boron atom and the salt thereof may be used singly as an aqueous solution or in combinations of two or more types thereof. In particular, a mixed aqueous solution of boric acid and borax is preferably used.

The aqueous solution of boric acid, and borax each can be added only by a comparatively dilute aqueous solution, but a concentrated aqueous solution can be made by mixing both of boric acid and borax and the coating liquid can be concentrated. Moreover, there is an advantage in that pH of the aqueous solution to be added can be controlled relatively freely.

In the present invention, it is preferable to use at least one of boric acid and a salt thereof and borax, to attain an effect of the present invention. When at least one of boric acid, and a salt thereof and borax is used, it is easy to form a hydrogen bond network of metal oxide particles and an OH group of polyvinyl alcohol that is a water-soluble polymer. As a result, interlayer mixing between the high refractive index layer and the low refractive index layer is suppressed, and thus it can be considered that desirable near-infrared shielding performance is achieved. In particular, when a set mode coating process is used in which a multi-layered layer of the high refractive index layer and the low refractive index layer is coated by a coater, the film surface temperature of the coating film is cooled to about 15° C. once, and then the film surface is dried, it is possible to exhibit more preferable effect.

The content of the curing agent in the high refractive index layer is preferably 1 to 10% by mass, and more preferably 2 to 6% by mass with respect to 100% by mass of the solid content of the high refractive index layer.

In particular, when polyvinyl alcohol is used as the first water-soluble polymer, the total use amount of the curing agent is preferably 1 to 600 mg per 1 g of polyvinyl alcohol, and more preferably 100 to 600 mg per 1 g of polyvinyl alcohol.

[Surfactant]

From the viewpoint of coatability, the high refractive index layer according to the present invention and a low refractive index layer to be described later preferably contain a surfactant.

As a surfactant used for adjusting the surface tension at the time of the coating, an anionic surfactant, a nonionic surfactant, an amphoteric surfactant, or the like may be used. Of these, an anionic surfactant is more preferable. Preferred examples of a compound include a compound containing a hydrophobic group having 8 to 30 carbon atoms and a sulfonic acid group or a salt, thereof in one molecule.

Examples of the anionic surfactant which may be used herein include a surfactant selected from the group consisting of alkyl benzene sulfonate, alkyl naphthalene sulfonate, alkane or olefin sulfonate, alkyl sulfate, polyoxyethylene alkyl or alkyl aryl ether sulfate, alkyl phosphate, alkyl diphenyl ether disulfonate, ether carboxylate, alkyl sulfosuccinate, α-sulfo fatty acid ester, and fatty acid salt; a condensate of a higher fatty acid and an amino acid; and naphthenate. Examples of the anionic surfactant which is preferably used include a surfactant selected from the group consisting of alkyl benzene sulfonate (especially, linear alkyl benzene sulfonate), alkane or olefin sulfonate (especially, secondary alkane sulfonate and α-olefin sulfonate), alkyl sulfate, polyoxyethylene alkyl or alkyl aryl ether sulfate (especially, polyoxyethylene alkyl ether sulfate), alkylphosphate (especially, monoalkyl phosphate), ether carboxylate, alkyl sulfosuccinate, α-sulfo fatty acid ester, and fatty acid salt. Alkyl sulfosuccinate is particularly preferable.

The content of the surfactant in the high refractive index layer is preferably 0.001 to 0.03% by mass, and more preferably 0.005 to 0.015% by mass, when the total mass of the coating liquid for a high refractive index layer is 100% by mass.

(Additives)

In the high refractive index layer according to the present invention and the low refractive index layer to be described later, various additives can be used if needed. In addition, the content of the additive in the high, refractive index layer is preferably 0 to 20% by mass with respect to 100% by mass of the solid, content of the high refractive index layer. Examples of the additive will be described below.

(Amino Acid Having Isoelectric Point of 6.5 or Less)

The high refractive index layer or the low refractive index layer according to the present invention may contain an amino acid having an isoelectric point of 6.5 or less. By containing an amino acid, dispersibility of metal oxide particles in the high refractive index layer or the low refractive index layer can be improved.

The amino acid used herein is a compound which has an amino group and a carboxyl group in the same molecule, and may be any type of α-, β-, and γ-amino acids. Although some of the amino acid has optical isomers, in the present invention, there is no difference in effects caused by the optical isomers. Any one of the isomers may be used independently or used as a racemic mixture.

The detailed description of the amino acid may be referred to the description on page 268 to page 270 in Encyclopaedia Chemical 1 Miniature Edition (Kyoritsu shuppan Co., Ltd.; issued on Showa 35 (1960)).

Specific preferred examples of the amino acid include aspartic acid, glutamic acid, glycine, and serine. Glycine and serine are particularly preferable.

With regard to the isoelectric point of an amino acid, since an amino acid has a specific pH value at which a positive charge and a negative charge in the molecule of the amino acid are made balance with each other such that the total charge becomes zero (0), the isoelectric point means the specific pH value. The isoelectric point of each amino acid can be obtained through isoelectric point electrophoresis at the low ionic strength.

(Emulsion Resin)

The high refractive index layer or the low refractive index layer according to the present invention may further contain an emulsion resin. By containing the emulsion resin, flexibility of the film, is increased so that processability such as adhesion onto a glass is improved.

The emulsion resin is a resin in which resin fine particles, for example, resin particles having an average particle diameter of 0.01 to 2.0 µm or so are dispersed in an emulsion state in a water-based, medium, and is produced by emulsion polymerization of an oil-soluble monomer by use of a high molecular dispersant having a hydroxyl group. A basic difference is not observed in the polymer component of the obtained emulsion resin depending on kinds of a dispersant to be used. Examples of the dispersant used at the time of emulsion polymerization include low molecular dispersants such as alkylsulfonates, alkylbenzene sulfonates, diethylamine, ethylene diamine, and a quaternary ammonium salt, and high molecular dispersants such as polyoxyethylene nonylphenyl ether, polyoxyethylene lauryl acid ether, hydroxyethyl cellulose, and polyvinyl pyrrolidone. If the emulsion polymerization is made by use of a polymer dispersant having a hydroxyl group, it is presumed that hydroxyl groups reside on at least the surfaces of fine microparticles. Accordingly, it is considered that the resultant emulsion resin is different in a chemical or physical property of emulsion from the emulsion resin obtained by use of the other dispersants.

The high molecular dispersant having a hydroxyl group has a weight-average molecular weight of 10,000 or more and is substituted with a hydroxyl group at its side chain or terminal. Examples of the high molecular dispersant include a copolymer of 2-ethyl hexyl acrylate with acrylic polymer such as sodium polyacrylate and polyacrylamide; polyether such as polyethylene glycol and polypropylene glycol; and polyvinyl alcohol. Of these, polyvinyl alcohol is particularly preferable.

Examples of the polyvinyl alcohol used as the high molecule dispersant include, in addition to ordinary polyvinyl alcohols obtained through hydrolysis of polyvinyl acetate, modified polyvinyl alcohols such as cationically-modified polyvinyl alcohols, anionically-modified polyvinyl alcohols having an anionic group such as a carboxyl group, and silyl-modified polyvinyl alcohols having a silyl group. In the polyvinyl alcohol, as an average degree of polymerization becomes higher, the effect to suppress occurrence of cracks at the time of formation of an ink absorption layer becomes larger. However, the average degree of polymerization being 5000 or less allows the viscosity of an emulsion resin to become not high, facilitates easy handling at the time of production. Accordingly, the average degree of polymerization is preferably 300 to 5000, more preferably 1500 to 5000, and particularly preferably 3000 to 4500. The degree of saponification of the polyvinyl alcohol is preferably 70 to 100 mol %, and more preferably 80 to 99.5 mol %.

Examples of the resin polymerized in emulsion by the above-described high molecule dispersants include ethylene monomers such as acrylic acid ester, methacrylic acid ester, a vinyl-based compound, and a styrene-based compound; and homopolymers or copolymers of diene-based compounds such as butadiene and isoprene. Specific examples include an acrylic resin, a styrene-butadiene type resin and an ethylene-vinyl acetate type resin.

In addition to these, the high, refractive index layer according to the present invention or the low refractive index layer to be described later may contain various known additives. Examples of the additives include an ultraviolet absorbing agent described in JP-A No. Sho57-74193, Sho57-87988, and Sho 62-261476; an anti-discoloring agent and various anionic, cationic, and non-ionic surfactants described in JP-A No. Sho57-74192, Sho 57-87989, Sho60-72785, Sho61-146591, Hei1-95091 and Hei3-13376; a fluorescent whitener, pH adjusters, such as sulfuric acid, phosphoric acid, acetic acid, citric acid, sodium hydroxide, potassium hydroxide, and potassium carbonate, a defoaming agent, a lubricant such as diethylene glycol, an antiseptic agent, an antistatic agent, and a mattifying agent described in JP-A No. Sho59-42993, Sho59-52689, Sho62-280069, and Sho61-242871 and Sho 4-219266.

As described above, in the present invention, when the titanium, oxide particles coated with silica-containing hydrated oxide are contained in the high refractive index layer, the interaction between the silicon-containing hydrated oxide and the first water-soluble polymer acts and thus the interlayer mixing between the high refractive index layer and the low refractive index layer is suppressed. Moreover, it is possible to prevent a problem such as deterioration of a binder or chalking caused by the photo-catalytic activity of titanium oxide particles. According to this, the near-infrared shielding film of the present invention is excellent in durability and film flexibility and has high visible light transmittance and an excellent near-infrared shielding property.

<Low Refractive Index Layer>

The low refractive index layer according to the present invention contains the second water-soluble polymer and the second metal oxide particles as essential components, and if needed, may contain at least one selected from the group consisting of a curing agent, a surfactant, and various additives.

The refractive index of the low refractive index layer according to the present invention is preferably 1.10 to 1.60, and more preferably 1.30 to 1.50.

The thickness per one layer of the low refractive index layer according to the present invention is preferably 20 to 800 nm, and more preferably 50 to 350 nm.

[Second Metal Oxide Particles]

As for the second metal oxide particles according to the present invention, silica (silicon dioxide) is preferably used, and specific examples thereof include synthetic non-crystalline silica and colloidal silica. Among these, it is more preferable to use an acidic colloidal silica sol and still more preferable to use a colloidal silica sol dispersed in an organic solvent. Moreover, in order to further reduce the refractive index, it is possible to use hollow fine particles having pores inside the particle as the second metal oxide fine particles and hollow fine particles of silica (silicon dioxide) is particularly preferable. Further, well-known metal oxide particles other than silica may be used.

In the present invention, the average primary particle diameter of the second metal oxide particles (preferably silicon dioxide) is preferably 3 to 100 nm. The average primary particle diameter of silicon dioxide dispersed in the state of the primary particle (average primary particle diameter in a dispersion liquid state before coating) is more preferably 3 to 50 nm, still more preferably 3 to 40 nm, particularly preferably 3 to 20 nm, and most preferably 4 to 10 nm. Moreover, the average particle diameter of secondary particles is preferably 30 nm or less, from the viewpoint of excellent visible light transmission as having low haze.

In the present invention, the average particle diameter of the primary particles of the second metal oxide particles is measured by observing the particles themselves or the particles exposed on a cross-section or surface of the refractive index layer under an electron microscope, measuring the particle diameters of 1,000 arbitrary particles, and obtaining a simple average value thereof (number average value). Herein, the particle diameter of each particle represents a diameter of a circle assumed to be the same as the reflected area.

Further, in the present invention, the particle diameters of the second metal oxide particles can be also obtained from a volume average particle diameter in addition to an average primary particle diameter. Incidentally, the measurement method of the volume average particle diameter is the same as the case of the first metal oxide particles described above.

The colloidal silica used in the present invention is obtained by heating and aging of silica sol that is obtained by metathesis reaction with an acid or the like of sodium silicate or by passing through an ion exchange resin layer, and it is described, for example, in JP-A No. Sho57-14091, JP-A No. Sho 60-219083, JP-A No. Sho60-219084, JP-A No. Sho61-20792, JP-A No. Sho61-188183, JP-A No. Sho63-17807, JP-A No. Hei4-93284, JP-A No. Hei 5-278324, JP-A No. Hei 6-92011, JP-A No. Hei6-183134, JP-A No. Hei6-297830, JP-A No. Hei7-81214, JP-A No. Hei7-101142, JP-A No. Hei7-179029, JP-A No. Hei7-137431, and WO 94/26530 A.

As for the colloidal silica, a synthesized product may be used or a commercially available product may be used. The surface of the colloidal silica may be cationically-modified or treated with Al, Ca, Mg, or Ba.

In the present invention, hollow fine particles may be used as the second metal oxide particles. When hollow fine particles are used, an average particle pore diameter thereof is preferably 3 to 70 nm, more preferably 5 to 50 nm, and still more preferably 5 to 45 nm. Incidentally, the average particle pore diameter of the hollow fine particles means the average value of inner diameter of the hollow fine particles. In the present invention, when the average particle pore diameter of the hollow fine particles is within the above range, the refractive index of the low refractive index layer can become sufficiently low. The average particle pore diameter is obtained by observing randomly 50 or more pore diameters of a circle, an oval, or a substantially circle or oval under an electron microscope to obtain a pore diameter of each particle and obtaining the number average value of them. Meanwhile, in the description, the average particle pore diameter means the minimum, distance among the distances between two parallel lines tangent to the outlines of the diameter of a pore, which is observed as a circle, an oval, or a substantially oval or circle.

The content of the second metal oxide particles in the low refractive index layer is preferably 0.1 to 70% by mass, more preferably 30 to 70% by mass, and still more preferably 45 to 65% by mass, with respect to 100% by mass of the solid content of the low refractive index layer.

[Second Water-Soluble Polymer]

The descriptions of specific examples of the second water-soluble polymer according to the present invention, preferable weight-average molecular weight, and the like are the same as those described in the above first, water-soluble polymer section, and thus the descriptions thereof will not be provided herein. As the second water-soluble polymer according to the present invention, polyvinyl alcohol is preferably used, and further, polyvinyl alcohol different from polyvinyl alcohol, which is preferably used as the first water-soluble polymer, is more preferably used. Herein, the polyvinyl alcohol different from polyvinyl alcohol used as the first water-soluble polymer means that at least one selected from the group consisting of the type of modification, the degree of saponification, the degree of polymerization and the weight-average molecular weight of the polyvinyl alcohol is different from polyvinyl alcohol used as the first water-soluble polymer.

In the low refractive index layer according to the present invention, other water-soluble polymers may be used in combination with polyvinyl alcohol preferably used as the second water-soluble polymer. At this time, the content of other polymers used in combination may be 0.5 to 10% by mass with respect to 100% by mass of the solid content of the low refractive index layer.

The content, of the second, water-soluble polymer in the low refractive index layer according to the present invention is preferably 30 to 99.9% by mass and more preferably 33 to 55% by mass with respect to 100% by mass of the solid content of the low refractive index layer.

In the low refractive index layer, the content of other water-soluble polymers used in combination with polyvinyl alcohol, which is preferably used as the second water-soluble polymer, may be 0.5 to 10% by mass with respect to 100% by mass of the solid content of the low refractive index layer.

[Curing Agent]

The low refractive index layer according to the present invention may further include a curing agent similarly to the high refractive index layer. The curing agent is not particularly limited as long as it is cured by reacting with the second water-soluble polymer in the low refractive index layer. In particular, as a curing agent in a case where polyvinyl alcohol is used as the second water-soluble polymer, at least one of boric acid and a salt thereof, and borax is preferable. In addition to these, well-known curing agents may be used.

The content of the curing agent in the low refractive index layer is preferably 1 to 10% by mass and more preferably 2 to 6% by mass with respect to 100% by mass of the solid content of the low refractive index layer.

In particular, the total amount of the curing agent used in a case where polyvinyl alcohol is used, as the second water-soluble polymer is preferably 1 to 600 mg per 1 g of polyvinyl alcohol and more preferably 100 to 600 mg per 1 g of polyvinyl alcohol.

Specific examples and the like of the curing agent are the same as those in the above-described high refractive index layer, and thus the description thereof will not be provided.

[Surfactant]

It is preferable that the low refractive index layer according to the present invention contain a surfactant from the viewpoint, of coatability. Specifically, it is preferable that an anionic surfactant be contained. As a surfactant in the present invention, the same surfactant contained in the above-described high refractive index layer can be used, and thus the description thereof will not be provided herein.

The content of the surfactant in the low refractive index layer is preferably 0.001 to 0.03% by mass and more preferably 0.005 to 0.02% by mass when the total amount of the coating liquid of the low refractive index layer is 100% by mass.

[Additive]

In the low refractive index layer according to the present invention, if needed, various additives can be used. The same additives used in the above-described high refractive index layer can be used as various additives in the low refractive index layer, and thus the description thereof will not be provided herein.

<Substrate>

The thickness of the substrate which is a support body of the infrared shielding film according to the present invention is preferably 5 to 200 µm, and more preferably 15 to 150 µm. Further, the substrate according to the present invention may be used in a state where two substrates are overlapped, to each, other. In this case, kinds of the substrates may be the same or different from each other.

A substrate applied to the infrared shielding film of the present invention is not particularly limited as long as it is transparent, and various resin films may be used. Examples of the resin films include polyolefin films (polyethylene, polypropylene, and the like), polyester films (polyethylene terephthalate, polyethylenenaphthalate, and the like), polyvinyl chloride, and cellulose triacetate. Of these, polyester films are preferable. The polyester film (hereinafter, referred to as polyester) is not particularly limited. However, the polyesters have preferably a film forming ability which makes a dicarboxylic acid component and a diol component as main constitutional components. Examples of the dicarboxylic acid component of the main constitutional components include terephthalic acid, isophthalic acid, phthalic acid, 2,6-naphthalene dicarboxylic acid, 2,7-naphthalene dicarboxylic acid, diphenylsulfone dicarboxylic acid, diphenyl ether dicarboxylic acid, diphenylethanedicarboxylic acid, cyclohexanedicarboxylic acid, diphenyl dicarboxylic acid, diphenylthioether dicarboxylic acid, diphenyl ketone dicarboxylic acid, and phenylindan dicarboxylic acid. Further, examples of the diol component include ethylene glycol, propylene glycol, tetramethylene glycol, cyclohexane dimethanol, 2,2-bis(4-hydroxyphenyl)propane, 2,2-bis(4-hydroxyethoxyphenyl)propane, bis(4-hydroxyphenyl) sulfone, bisphenol fluorenedihydroxyethyl ether, diethylene glycol, neopentylglycol, hydroquinone, and cyclohexanediol. Among the polyesters making these components as the main constitutional components, from the viewpoints of transparency, mechanical strength, dimensional stability, and the like, polyesters preferably make terephthalic acid or 2,6-naphthalene dicarboxylic acid as a dicarboxylic acid component and ethylene glycol or 1,4-cyclohexane dimethanol as a diol component in the main constitutional components. Of these, polyesters which make polyethylene terephthalate or polyethylenenaphthalate as the main constitutional components, copolymerized polyesters composed of terephthalic acid, 2,6-naphthalene dicarboxylic acid, and ethylene glycol, and polyesters which makes a mixture of two or more kinds of the above polyesters as the main constitutional components are preferable.

Further, the substrate preferably has a transmittance of a visible light region prescribed in JIS R3106-1998 of 85% or more, and particularly preferably 90% or more. By having the substrate with the same or greater transmission than above, it is advantageous in that the transmittance of a visible light region prescribed in JIS R3106-1998 is 50% or more when it is prepared as an infrared shielding film, and thus preferable.

Further, the substrate using the above resin or the like may be either a non-stretched film or a stretched film. From the viewpoints of improving strength and inhibiting thermal expansion, a stretched film is preferable.

The substrate can be produced by a known general method in the related art. For example, by melting a resin as a material using an extruder and extruding the resin using an annular die or a T die followed by rapid cooling, a non-stretched substrate which, is substantially amorphous and not oriented can be produced. Further, a stretched substrate can be produced by stretching a non-stretched substrate in a flow (vertical axis) direction of the substrate or a direction perpendicular (horizontal axis) to the flow direction of the substrate by a known method such as monoaxial stretching, tenter type successive biaxial stretching, tenter type simultaneous biaxial stretching, or tubular type simultaneous biaxial stretching. For such a case, the stretching ratio can be suitably selected, in accordance with the resin as a raw material of the substrate. However, the stretching ratio is preferably 2 to 10 times, in vertical axis direction and horizontal axis direction, respectively.

Further, from the viewpoint of dimensional stability, the substrate may be subjected to a relaxing treatment or an off-line heating treatment. After thermal fixing of the polyester film during stretching and film forming process, the relaxing treatment is preferably performed during a step within a tenter for horizontal stretching or winding after exit from, the tenter. The relaxing treatment is preferably performed at a treatment temperature of 80 to 200° C. More preferably, the treatment temperature is 100 to 180° C. Moreover, the relaxing treatment is preferably performed in a range in which a relaxing rate is 0.1 to 10% both in the length direction and in the width direction. More preferably, the relaxing treatment is performed with a relaxing rate of 2 to 6%. The substrate after the relaxing treatment has favorable dimensional stability as well as improved heat resistance as a result of performing an off-line heating treatment, which is described below.

A coating liquid for an undercoating layer is preferably in-line coated on one surface or both surfaces of the substrate during the film forming process. In the present invention, coating an undercoating during the film forming process is referred to as in-line undercoating. Examples of a resin used for the coating liquid for an undercoating layer, which is useful in the present invention, include a polyester resin, an acryl modified polyester resin, a polyurethane resin, an acrylic resin, a vinyl resin, a vinylidene chloride resin, a polyethylene imine vinylidene resin, a polyethyleneimine resin, a polyvinyl alcohol resin, a modified polyvinyl alcohol resin, and gelatin, and all of them, can be preferably used. The undercoating layer may be added with known additives of the related art. Further, the undercoating layer may be coated by a well-known method such, as roll coating, gravure coating, knife coating, dip coating, and spray coating. The coating amount of the undercoating layer is preferably about 0.01 to 2 g/m$^2$ (in dry state).

{Production Method of Near-Infrared Shielding Film}

The production method of the near-infrared shielding film of the present invention is not particularly limited, but any method can be used as long as it is possible to form at least one unit consisting of a high refractive index layer and a low refractive index layer on a substrate.

In the production method of the near-infrared shielding film of the present invention, the near-infrared shielding film is formed by laminating units consisting of the high refractive index layer and the low refractive index layer on the substrate. Specifically, it is preferable that the lamination is formed by simultaneous multilayer coating of the high refractive index layer and the low refractive index layer and then drying them. More specifically, it is preferable to form a near-infrared shielding film including a high refractive index layer and a low refractive index layer by simultaneous multilayer coating of a coating liquid for a high refractive index layer and a coating liquid for a low refractive index layer on the substrate and then drying them.

As the coating method, for example, a curtain coating method, slide bead coating methods using a hopper which are described in U.S. Pat. No. 2,761,419 A and U.S. Pat. No. 2,761,791 A, an extrusion coat method, or the like may be preferably used.

A solvent, used to prepare the coating liquid for a high refractive index layer and the coating liquid for a low refractive index layer is not particularly limited, but water, an organic solvent, or a mixture solvent thereof is preferable. Further, in consideration of environment clue to scattering of the organic solvent, water, or a mixture solvent of water and a small amount of the organic solvent is more preferable, and water is particularly preferable.

Examples of the organic solvent include alcohols such as methanol, ethanol, 2-propanol, or 1-butanol; esters such as ethyl acetate, butyl acetate, propylene glycol monomethyl ether acetate, or propylene glycol monoethyl ether acetate;

ethers such as diethyl ether, propylene glycol monomethyl ether, or ethylene glycol monoethyl ether; amides such as dimethyl formamide or N-methylpyrrolidone; and ketones such as acetone, methyl ethyl ketone, acetylacetone, or cyclohexanone. The organic solvent may be used either singly or as a mixture of two or more types. From the viewpoints of environment, easy operability and the like, as a solvent for the coating liquid, water, and a mixture solvent of water and methanol, ethanol, or ethyl acetate are preferable, and water is more preferable.

When a mixture solvent of water and a small amount of the organic solvent is used, the content, of water in the mixture solvent is preferably 80 to 99.9% by mass, and more preferably 90 to 99.5% by mass, when the entire mixture solvent is 100% by mass. Herein, when the content of water is 80% by mass or more, it is possible to reduce a volume change due to evaporation of the solvent and to improve handling. In addition, when the content of water is 99.9% by mass or less, homogeneity is increased at the time of adding liquid and a stable liquid property can be achieved.

The concentration of the first water-soluble polymer in the coating liquid, for a high refractive index layer is preferably 1 to 10% by mass. Further, the concentration of the first metal oxide particles in the coating liquid for a high refractive index layer is preferably 1 to 50% by mass.

The concentration of the second water-soluble polymer in the coating liquid for a low refractive index layer is preferably 1 to 10% by mass. Further, the concentration of the second metal oxide particles in the coating liquid for a low refractive index layer is preferably 1 to 50% by mass.

A method for preparing the coating liquid for a high refractive index layer and the coating liquid for a low refractive index layer is not particularly limited. For example, there is a method of adding metal oxide particles, a water-soluble polymer, and other additives, which are added if needed, and mixing them by stirring. At that time, the addition order for each component, is not particularly limited. Each component may be added sequentially followed by mixing, or added all at once under stirring followed by mixing. If necessary, it is adjusted to suitable viscosity by additionally using a solvent.

In the present invention, it is preferable to form the high refractive index layer by using a water-based coating liquid for a high refractive index layer, which is prepared by adding and dispersing the first metal oxide particles. At that time, as for the first metal oxide particles of the present invention, it is preferable to add a sol, which has a pH of 5.0 or more and 7.5 or less and a negative zeta potential, to the coating liquid for a high refractive index layer for preparation.

When performing the simultaneous multilayer coating, the temperature of the coating liquid for a high refractive index layer and the coating liquid for a low refractive index layer is preferably in a temperature range of 25 to 60° C., and more preferably 30 to 45° C. when a slide bead coating method is used. Moreover, when a curtain coating method is used, the temperature is preferably in a temperature range of 25 to 60° C., and more preferably 30 to 45° C.

When performing the simultaneous multilayer coating, the viscosity of the coating liquid for a high refractive index layer and the coating liquid for a low refractive index layer is not particularly limited. However, when a slide bead coating method is used, the viscosity is preferably in a range of 5 to 100 mPa·s, and more preferably 10 to 50 mPa·s in the above-described preferable temperature range of the coating liquid. Moreover, when a curtain coating method is used, the viscosity is preferably in a range of 5 to 1200 mPa·s, and more preferably in the range of 25 to 500 mPa·s in the above-described preferable temperature range of the coating liquid. When the viscosity is in the above range, simultaneous multilayer coating can be performed effectively.

Further, the viscosity at 15° C. of the coating liquid is preferably 100 mPa·s or more, more preferably 100 to 30,000 mPa·s, still more preferably 3,000 to 30,000 mPa·s, and most preferably 10,000 to 30,000 mPa·s.

As for the coating and drying method, it is preferable that the coating liquid for a high refractive index layer and the coating liquid for a low refractive index layer are heated to 30° C. or higher, coating is performed, and then the temperature of the formed coating film is first cooled to 1 to 15° C. to be dried at 10° C. or higher. As for the drying condition, it is more preferable that drying is carried out at a wet bulb temperature in a range of 5 to 50° C. and a film surface temperature in a range of 10 to 50° C. With regard to a cooling mode immediately after the coating, it is preferable to perform the cooling in a horizontal set mode from the viewpoint of the uniformity of the formed coating film.

The near-infrared shielding film of the present invention may have, under the substrate or on top of the outermost layer on opposite side of the substrate, one or more of functional layer such as a conductive layer, an anti-static layer, a gas barrier layer, an easy adhesion layer (adhesive layer), an anti-fouling layer, a disinfecting layer, a droplet flowing layer, a lubricating layer, a hard coat layer, an anti-wearing layer, an anti-reflection layer, an electromagnetic wave shield layer, a ultraviolet absorbing layer, an infrared absorbing layer, a print layer, a fluorescence luminescent layer, a hologram layer, a release layer, a tacky layer, an adhesive layer, an infrared cut layer (a metal layer and a liquid crystal layer) other than the high refractive index layer and the low refractive index layer of the present invention, a colored layer (a layer for absorbing visible light), or an intermediate film layer used for laminated glass for the purpose of having additional functions.

In the near-infrared, shielding film used for the infrared shielding body in the present invention, when various functional layers described above are included, the lamination order is not particularly limited.

For example, in a specification in which the near-infrared shielding film of the present, invention is pasted on the indoor side of window glasses (indoor pasting), an aspect, where an optical interference film and a tacky layer are laminated on the substrate surface in this order, and a hard coat layer is formed by coating on the substrate surface opposite to the side on which the optical interference film and the tacky layer are laminated is exemplified as a preferred example. Moreover, the lamination order of the tacky layer, the substrate, the optical interference film, and the hard coat layer may be applicable, or other functional layers, the substrate, an infrared absorbing agent, or the like may be further included. In addition, in a specification in which the near-infrared shielding film of the present invention is pasted on the outdoor side of window glasses (outdoor pasting), a configuration in which an optical interference film and a tacky layer are laminated on the substrate surface in this order, and a hard coat layer is formed by coating on the substrate surface opposite to the side on which the optical interference film and the tacky layer are laminated is exemplified as a preferred example. Similarly to the case of indoor pasting, the lamination order of the tacky layer, the substrate, the optical interference film, and the hard coat layer may be applicable, or other functional layers, an infrared absorbing agent, or the like may be further included.

{Near-Infrared Shielding Body}

The near-infrared shielding film provided with infrared shielding of the present invention is applicable to broad fields. For example, for the purpose of mainly enhancing weather resistance, the near-infrared shielding film is used as a film for being attached to windows, and a film for agricultural vinyl greenhouses in such a manner that the film is pasted on facilities (substrates) such as outdoor windows of buildings or car windows which are exposed to sunbeams for a long time so as to exhibit a near-infrared shielding effect. In particular, it is preferable that the near-infrared shielding film according to the present invention be pasted directly or via an adhesive onto a glass or a member, in replace of a glass, which is pasted on a substrate such as a resin.

In other words, according to another embodiment of the invention, a near-infrared shielding body in which the near-infrared shielding film according to the present invention is formed on at least one surface of the substrate is provided.

Specific examples of the substrate include a glass, a polycarbonate resin, a poly sulfone resin, an acrylic resin, a polyolefin resin, a polyether resin, a polyester resin, a polyamide resin, a polysulfide resin, an unsaturated polyester resin, an epoxy resin, a melamine resin, a phenol resin, a diallylphthalate resin, a polyimide resin, a urethane resin, a polyvinyl acetate resin, a polyvinyl alcohol resin, a styrene resin, a vinyl chloride resin, a metal plate, and ceramics. The type of resins may be any one of a thermoplastic resin, a thermosetting resin, an ionizing radiation curing resin, and may be used in combination of two or more types. The substrate which may be used in the present invention can be produced by a known method such as extrusion molding, calendar molding, injection molding, hollow molding, or compression molding. The thickness of the substrate is, although not particularly limited, generally 0.1 mm to 5 cm.

When the near-infrared shielding film is pasted on the substrate, it is preferable that an adhesive layer or a pasting layer be disposed such that the near-infrared shielding film is positioned at a sunbeam (heat ray) incident side. Further, the sandwiching of the near-infrared shielding film according to the present invention between the window glass and the substrate enables to seal the near-infrared shielding film from environment gas such as moisture. Accordingly, it is preferable from the point of excellent durability. The disposition of the near-infrared shielding film according to the present invention at the outdoor side or the outside (for outdoor pasting) of vehicles is also preferable to enhance the durability for environment.

As an adhesive which is used for pasting the near-infrared shielding film and the substrate, an adhesive including a light curable or thermosetting resin as a main component may be used.

The adhesive is preferable to have durability for ultraviolet rays, and an acrylic-based adhesive or a silicone-based adhesive is preferable. Further, from the viewpoints of adhesion characteristics and cost, an acrylic-based adhesive is preferable. In particular, from the viewpoint of easy control of peel-off resistance, as for an acrylic-based adhesive, the solvent-type is preferable. In a case where a solution polymerization polymer is used as an acrylic solvent-type adhesive, a well-known monomer can be used.

Further, as an interlayer of a laminated glass, a polyvinyl butyral resin or an ethylene-vinylacetate copolymer resin may be used. Specific examples include plasticity polyvinyl butyral (manufactured by Sekisui Chemical Co., Ltd., and Mitsubishi Monsanto Co., or the like), an ethylene-vinylacetate copolymer (Duramin, manufactured by Du Pont Kabushiki Kaisha, and Takeda Chemical Industries, Ltd.), and a modified ethylene-vinylacetate copolymer (Melsen G, manufactured by TOSOH CORP.). Moreover, into the adhesive layer, an ultraviolet absorbing agent, an anti-oxidant, an antistatic agent, a heat stabilizer, a lubricant, a bulking agent, a coloring agent, an adhesion regulating agent, and the like may be suitably added and blended.

The heat insulating performance and solar heat shielding performance of a near-infrared shielding film or a near-infrared shielding body can be generally obtained by methods based on J is R3209-1998 (Sealed insulating glass), JIS R3106-1998 (Testing method on transmittance, reflectance and emittance of flat glasses and evaluation of solar neat gain coefficient), and JIS R3107-1998 (Evaluation on thermal resistance of flat glasses and thermal transmittance of glazing).

With, regard to the measurement of solar transmittance, solar reflectance, emissivity, and visible light transmittance, (1) spectrophotometric transmittance and spectrophotometric reflectance of various single flat glasses are measured using a spectrophotometry light measuring device (a wavelength of 300 to 2500 nm). Further, by using a spectrophotometry light measuring device with a wavelength of 5.5 to 50 μm, the emissivity is measured. Meanwhile, as for the emissivity of a float plate glass, a polished plate glass, a template plate glass, and a heat ray-absorbing plate glass, previously determined values are used. (2) With regard to calculation of solar transmittance, solar reflectance, solar absorbance and corrected emissivity, solar transmittance, solar reflectance, solar absorbance, and normal emissivity are calculated according to JIS R3106-1998. The corrected emissivity is obtained by multiplying the normal emissivity by a coefficient described in JIS R3107-1998. For calculation of the heat insulating property and solar heat shielding property, (1) thermal resistance of a sealed insulating glass is calculated according to JIS R3209-1998 by using the measured thickness value and corrected emissivity. However, when a hollow layer is more than 2 mm, the gas heat conductance of the hollow layer is obtained according to JIS R3107-1998. (2) The heat insulating property is obtained as heat transmission resistance by adding the heat transfer resistance to the thermal resistance of the sealed insulating glass. (3) The solar heat shielding property is calculated by obtaining a solar heat gain coefficient according to JIS R3106-1998 and subtracting the result from 1.

EXAMPLES

Hereinafter, the present invention will be described in detail on the basis of Examples, but the present invention is not limited to these Examples. Incidentally, the expression of "part" or "%" referred to in Examples represents "part by mass" or "% by mass", unless otherwise specified.

Production of Near-Infrared Shielding Film

Example 1

Preparation of Coating Liquid H1 for High Refractive Index Layer (Preparation of Rutile-Type Titanium Oxide Used in First Metal Oxide Particles)

An aqueous suspension of titanium dioxide was prepared in such a manner that a titanium dioxide hydrate was suspended in water to make a concentration (when converted to $TiO_2$) become 100 g/L, 30 L of an aqueous solution of sodium hydroxide (concentration of 10 mol/L) was added to 10 L (liter) of the suspension while stirring, then heated to 90° C., and aged for five hours. Subsequently, the resultant solution was neutralized with hydrochloric acid, filtered and then washed with water.

Incidentally, the titanium dioxide hydrate used as a raw material in the above-described reaction (treatment) was obtained through thermal hydrolysis of an aqueous solution of titanium sulfate in accordance with the well-known procedure.

The base-treated titanium dioxide hydrate was suspended in pure water so as to make a concentration (when converted, to $TiO_2$) become 20 g/L. 0.4 mol % of citric acid with respect to the amount of $TiO_2$ was added thereinto while stirring. Thereafter, the resultant solution was heated and then, when the temperature of the mixed sol solution became 95° C., a concentrated hydrochloric acid was added to the solution so as to make a hydrochloric acid concentration become 30 g/L, followed by stirring for three hours while maintaining the temperature of the solution to 95° C., whereby a titanium oxide sol solution was prepared.

As described above, the obtained titanium oxide sol solution was subjected to measurement of pH and zeta potential. As a result, pH was 1.4 and zeta potential was +40 mV. Further, a particle diameter measurement was performed by Zetasizer Nano manufactured by Malvern Instruments Ltd. As a result, a degree of monodispersity was 16%.

Further, the titanium oxide sol solution was dried at 105° C. for three hours to obtain powder microparticles of titanium oxide. Subsequently, to 4 kg of pure water, 4 kg of 20.0% by mass water-based dispersion liquid of titanium oxide sol containing the obtained rutile-type titanium oxide microparticles was added to obtain 10.0% by mass water-based dispersion liquid of titanium oxide sol.

(Preparation of First Metal Oxide Particles by being Coated with Silicon-Containing Hydrated Oxide)

0.5 kg of 10.0% by mass water-based dispersion liquid of titanium oxide sol was added to 2 kg of pure water and heated to 90° C. Subsequently, 1.3 kg of aqueous solution of silicate, which was prepared to make a concentration (when converted to $SiO_2$) become 2.0% by mass, was gradually added and subjected to a heating treatment at 175° C. for 18 hours in an autoclave to be further concentrated. Therefore, a sol solution (solid content concentration of 20% by mass) containing the first metal oxide particles of titanium oxide particles having a rutile-type structure which are coated with $SiO_2$ was obtained. The average primary particle diameter was measured by an observation method using a transmission electron microscope and was 6.2 nm. Incidentally, each average primary particle diameter in all of the following Examples and Comparative Examples was also measured in the same manner.

Some of the above-obtained sol solution of the first metal oxide particles was dried at 105° C. for three hours to obtain powder microparticles of the first metal oxide coated with silicon-containing hydrated oxide and X-ray diffraction measurement was carried out on the powder microparticles by using JDX-3530 manufactured by JEOL Ltd. DATUM. Therefore, the volume average particle diameter was 10 nm. Incidentally, in the following Examples and Comparative Examples, if needed, by adjusting an amount of the aqueous solution of silicate used above and a heating time in an autoclave, it is possible to obtain first metal oxide particles having different volume average particle diameters. When a coating amount of silicon-containing hydrated oxide to be described below wants to be constant, only heating time of the autoclave may be adjusted in order to obtain particles having different volume average particle diameters. Incidentally, the volume average particle diameters were measured in the same manner as described above.

The average primary particle diameters in all of the following Examples and Comparative Examples were measured by an observation method using a transmission electron microscope. The average primary particle diameter of the first metal oxide particles obtained here was 6.2 nm.

Further, as a coating amount of the silicon-containing hydrated oxide in the first metal oxide particles obtained here, $SiO_2$ was 5% by mass with respect to titanium oxide particles. Moreover, in the following Examples, the coating amount of silicon-containing hydrated oxide was adjusted by changing an amount of the aqueous solution of silicate to be used.

The measurement method of the coating amount of silicon-containing hydrated oxide was as follows. The cross-sectional piece of the coating film obtained after coating was produced, elemental distributions (profiles) of Ti and Si in the thickness direction of the coating film were obtained by (semi) quantitative analysis using a well-known energy-dispersive X-ray analysis (EDX), and the element ratio of Si and Ti was converted to the weight ratio of $SiO_2$ and $TiO_2$ to obtain the coating amount.

28.9 parts of sol solution containing the above-obtained first metal oxide particles having a solid content concentration of 20.0% by mass, 10.5 parts of 1.92% by mass aqueous solution of citric acid, 2.0 parts of 10% by mass aqueous solution of polyvinyl alcohol (PVA103, manufactured by Kuraray Co., Ltd., average degree of polymerization of 300), and 9.0 parts of 3% by mass aqueous solution of boric acid were mixed to prepare a dispersion liquid H1 of first metal oxide particles.

Subsequently, the dispersion liquid H1 of first metal oxide particles obtained above was added with 16.3 parts of pure water and 33.5 parts of 5.0% by mass aqueous solution of polyvinyl alcohol (PVA217, manufactured by Kuraray Co., Ltd., average degree of polymerization of 1700) as the first water-soluble polymer under stirring. Further, 0.5 part of 1% by mass aqueous solution of anionic surfactant (manufactured by NOF CORPORATION, RAPISOL A30) was added to prepare total 1000 parts of coating liquid H1 for a high, refractive index layer by using pure water.

[Preparation of Coating Liquid L1 for Low Refractive Index Layer]

First, 680 parts of 10% by mass aqueous solution of colloidal silica (manufactured by Nissan Chemical Industries, Ltd., SNOWTEX OXS), 30 parts of 4.0% by mass aqueous solution of polyvinyl alcohol (manufactured by Kuraray Co., Ltd., PVA103: average degree of polymerization of 300), and 150 parts of 3.0% by mass aqueous solution of boric acid were mixed and dispersed. Pure water was added to prepare total 1000 parts of colloidal silica dispersion liquid L1.

Subsequently, the dispersion L1 obtained above was heated to 45° C., and sequentially added with 605 parts of 4.0% by mass aqueous solution of polyvinyl alcohol (manufactured by Kuraray Co., Ltd., PVA235: average degree of polymerization of 3,500) as the second water-soluble polymer and 155 parts of 4.0% by mass aqueous solution of polyvinyl alcohol (manufactured by JAPAN VAM & POVAL CO., LTD., JP45: average degree of polymerization of 4500) under stirring. Thereafter, 40 parts of 1% by mass aqueous solution of anionic surfactant (manufactured by NOF CORPORATION, RAPISOL A30) was added to prepare a coating liquid L1 for a low refractive index layer.

Production of Sample 1

By using a slide hopper coating apparatus which can be used for 9-layer multilayer coating, while the temperatures of the coating liquid L1 for a low refractive index layer and the coating liquid H1 for a high refractive index layer were maintained to 45° C., total nine layers were formed by simultaneous multilayer coating on a polyethylene terephthalate film with a thickness of 50 μm (A4300 manufactured by Toyobo Co., Ltd.; easy adhesion layer on both surfaces), which has been heated to 45° C., such that the thickness of each high refractive index layer and low refractive index layer was 130 nm at the time of drying, and five low refractive index layers and four high refractive index layers were alternately laminated.

Right after the coating, cold air at 5° C. was applied for setting. At that time, the time period until nothing sticks to a finger even after the surface was touched by the finger (setting time) was five minutes.

Upon the completion of the setting, hot air at 80° C. was applied for drying to produce a multilayer coating product consisting of nine layers.

Hereinafter, in Examples, if needed, a slide hopper coating apparatus which can be used for simultaneous coating of 21 layers, 23 layers, or 25 layers is used in addition to a slide hopper coating apparatus which can be used for simultaneous coating of nine layers. Accordingly, it is possible to produce multilayer coating products having different layer constitutions.

On top of the multilayer coating product with nine layers, 9-layer multilayer coating was further performed two times to produce Sample 1 consisting of 27 layers in total.

Example 2

Preparation of Coating Liquid H2 for High Refractive Index Layer

A coating liquid H2 for a high refractive index layer was prepared in the same manner as the coating liquid H1 for a high refractive index layer, except that the first metal oxide particles (average primary particle diameter: 6.7 nm) were prepared to be 8% by mass of $SiO_2$ as the coating amount of silicon-containing hydrated oxide with respect to titanium, oxide particles, and then used.

Production of Sample 2

Sample 2 was produced in the same manner as Sample 1, except that the coating liquid H2 for a high refractive index layer was used instead of the coating liquid H1 for a high refractive index layer.

Example 3

Preparation of Coating Liquid H3 for High Refractive Index Layer

A coating liquid H3 for a high refractive index layer was prepared in the same manner as the coating liquid H1 for a high refractive index layer, except that the first metal oxide particles (average primary particle diameter: 6.9 nm) were prepared to be 10% by mass of $SiO_2$ as the coating amount of silicon-containing hydrated oxide with respect to titanium oxide particles, and then used.

Production of Sample 3

Sample 3 was produced in the same manner as Sample 1, except that the coating liquid H3 for a high refractive index layer was used instead of the coating liquid H1 for a high refractive index layer.

Example 4

Preparation of Coating Liquid H4 for High Refractive Index Layer

A coating liquid H4 for a high refractive index layer was prepared in the same manner as the coating liquid H1 for a high refractive index layer, except that the first metal oxide particles (average primary particle diameter: 7.1 nm) were prepared to be 18% by mass of $SiO_2$ as the coating amount of silicon-containing hydrated oxide with respect to titanium oxide particles, and then used.

Production of Sample 4

Sample 4 was produced in the same manner as Sample 1, except that the coating liquid H4 for a high refractive index layer was used instead of the coating liquid H1 for a high refractive index layer.

Example 5

Preparation of Coating Liquid H5 for High Refractive Index Layer

A coating liquid H5 for a high refractive index layer was prepared in the same manner as the coating liquid H1 for a high refractive index layer, except, that, the first metal oxide particles (average primary particle diameter: 7.8 nm) were prepared to be 25% by mass of $SiO_2$ as the coating amount of silicon-containing hydrated oxide with respect to titanium oxide particles, and then used.

Production of Sample 5

Sample 5 was produced in the same manner as Sample 1, except that the coating liquid. H5 for a high refractive index layer was used instead of the coating liquid H1 for a high refractive index layer.

Example 6

Preparation of Coating Liquid H6 for High Refractive Index Layer

A coating liquid H6 for a high refractive index layer was prepared in the same manner as the coating liquid H1 for a high refractive index layer, except that the first, metal oxide particles (average primary particle diameter: 6.3 nm) were prepared to be 25 nm of a volume average particle diameter, and then used.

Production of Sample 6

Sample 6 was produced in the same manner as Sample 1, except that the coating liquid H6 for a high refractive index layer was used instead of the coating liquid H1 for a high refractive index layer.

Example 7

Preparation of Coating Liquid H7 for High Refractive Index Layer

A coating liquid H7 for a high refractive index layer was prepared, in the same manner as the coating liquid H1 for a high refractive index layer, except that the first metal oxide particles (average primary particle diameter: 6.2 nm) were prepared to be 30 nm of a volume average particle diameter of titanium oxide particles, and then used.

Production of Sample 7

Sample 7 was produced in the same manner as Sample 1, except that the coating liquid H7 for a high refractive index layer was used instead of the coating liquid H1 for a high refractive index layer.

Example 8

Preparation of Coating Liquid H8 for High Refractive Index Layer

A coating liquid H8 for a high refractive index layer was prepared in the same manner as the coating liquid H1 for a high refractive index layer, except that polyvinyl alcohol PVA224 (manufactured by Kuraray Co., Ltd.) was used as the first water-soluble polymer, instead of polyvinyl alcohol PVA217. Moreover, the average primary particle diameter of the prepared first metal oxide particles was 6.3 nm.

Production of Sample 8

Sample 8 was produced in the same manner as Sample 1, except that the coating liquid H8 for a high refractive index layer was used instead of the coating liquid H1 for a high refractive index layer.

Example 9

Preparation of Coating Liquid H9 for High Refractive Index Layer

A coating liquid H9 for a high refractive index layer was prepared in the same manner as the coating liquid H1 for a high refractive index layer, except that polyvinyl alcohol PVA235 (manufactured by Kuraray Co., Ltd.) was used as the first water-soluble polymer, instead of polyvinyl alcohol PVA217.

Production of Sample 9

Sample 9 was produced in the same manner as Sample 1, except that the coating liquid H9 for a high refractive index layer was used instead of the coating liquid H1 for a high refractive index layer.

Example 10

Preparation of Coating Liquid H10 for High Refractive Index Layer

A coating liquid H10 for a high refractive index layer was prepared in the same manner as the coating liquid H1 for a high refractive index layer, except that anatase-type titanium oxide particles were first, prepared by an acid-added hydrothermal treatment described in JP-A No. 11-335121 and the anatase-type titanium oxide particles were used when the first metal oxide particles were prepared, instead of rutile-type titanium oxide particles.

Production of Sample 10

Sample 10 was produced in the same manner as Sample 1, except that the coating liquid H10 for a high refractive index layer was used instead of the coating liquid H1 for a high refractive index layer.

Example 11

Preparation of Coating Liquid H11 for High Refractive Index Layer

A coating liquid H11 for a high refractive index layer was prepared in the same manner as the coating liquid H1 for a high refractive index layer, except that gelatin (A-U, manufactured by JELLICE Co., Ltd.) was used as the first water-soluble polymer, instead of polyvinyl alcohol (PVA217).

Production of Sample 11

Sample 11 was produced in the same manner as Sample 1, except that the coating liquid H11 for a high refractive index layer was used instead of the coating liquid H1 for a high refractive index layer and simultaneous multilayer coating of 25 layers was performed.

Example 12

Preparation of Coating Liquid H12 for High Refractive Index Layer

A coating liquid H12 for a high refractive index layer was prepared, in the same manner as the coating liquid H1 for a high refractive index layer, except that hydroxyethyl cellulose (SP200, manufactured by DAICEL FINECHEM LTD.) was used as the first water-soluble polymer, instead of polyvinyl alcohol (PVA217). Moreover, the average primary particle diameter of the prepared first metal oxide particles was 6.1 nm.

Production of Sample 12

Sample 12 was produced in the same manner as Sample 1, except that, the coating liquid. H12 for a high refractive index layer was used instead of the coating liquid H1 for a high refractive index layer and simultaneous multilayer coating of 23 layers was performed.

Example 13

Preparation of Coating Liquid H13 for High Refractive Index Layer

A coating liquid H13 for a high refractive index layer was prepared in the same manner as the coating liquid H1 for a high refractive index layer, except that locust bean gum (RL-700-J, manufactured by Sansho Co., Ltd.) was used as the first water-soluble polymer, instead of polyvinyl alcohol (PVA217).

Production of Sample 13

Sample 13 was produced in the same: manner as Sample 1, except that the coating liquid H13 for a high refractive index layer was used instead of the coating liquid H1 for a high refractive index layer.

Example 14

Preparation of Coating Liquid H14 for High Refractive Index Layer

A coating liquid H14 for a high refractive index layer was prepared in the same manner as the coating liquid H1 for a high refractive index layer, except that an aqueous solution of boric acid was not added. Moreover, the average primary particle diameter of the prepared first metal oxide particles was 6.1 nm.

Preparation of Coating Liquid L2 for Low Refractive Index Layer

A coating liquid L2 for a low refractive index layer was prepared in the same manner as the coating liquid L1 for a low refractive index layer, except that an aqueous solution of boric acid was not added.

Production of Sample 14

Sample 14 was produced in the same manner as Sample 1, except that the coating liquid H14 for a high refractive index layer was used instead of the coating liquid H1 for a high refractive index layer and the coating liquid 12 for a low refractive index layer was used instead of the coating liquid L1 for a low refractive index layer.

Example 15

Preparation of Coating Liquid H15 for High Refractive Index Layer

A dispersion liquid. HIS of first metal oxide particles was prepared in the same manner as the dispersion liquid H1 of first metal oxide particles, except that 28.9 parts of sol solution containing the first metal oxide particles having a solid content concentration of 20.0% by mass was changed to 12.9 parts of sol solution.

Subsequently, a coating liquid H15 for a high refractive index layer was prepared in the same manner as the coating liquid H1 for a high refractive index layer, except that the dispersion liquid H15 of first metal oxide particles obtained above was used.

Production of Sample 15

Sample 15 was produced in the same manner as Sample 1, except that the coating liquid H15 for a high refractive index layer was used instead of the coating liquid H1 for a high refractive index layer.

Example 16

Preparation of Coating Liquid H16 for High Refractive Index Layer

A dispersion liquid H16 of first, metal oxide particles was prepared in the same manner as the dispersion liquid H1 of first metal oxide particles, except that 28.9 parts of sol solution containing the first metal oxide particles having a solid content concentration of 20.0% by mass was changed to 20.2 parts of sol solution.

Subsequently, a coating liquid H16 for a high refractive index layer was prepared in the same manner as the coating liquid H1 for a high refractive index layer, except that the dispersion liquid H16 of first metal oxide particles obtained above was used.

Production of Sample 16

Sample 16 was produced in the same manner as Sample 1, except that the coating liquid H16 for a high refractive index layer was used instead of the coating liquid H1 for a high refractive index layer.

Example 17

Production of Sample 17

Preparation of Coating Liquid H17 for High Refractive Index Layer

A coating liquid H17 for a high refractive index layer was prepared, in the same manner as the coating liquid H1 for a high refractive index layer, except that the first metal oxide particles (average primary particle diameter: 6.7 nm) were prepared to be 8% by mass of $SiO_2$ as the coating amount of silicon-containing hydrated oxide with respect to titanium, oxide particles, and then used.

Production of Sample 17

Sample 17 was produced in the same manner as Sample 1, except that the coating liquid H17 for a high refractive index layer was used instead of the coating liquid H1 for a high refractive index layer and 21-layer simultaneous multilayer coating was repeated two times to perform total 42-layer multilayer coating.

Example 18

Production of Sample 18

Sample 18 was produced in the same manner as Sample 1, except that total 21-layer simultaneous multilayer coating was respectively performed for both surfaces of polyethylene terephthalate film.

Example 19

Preparation of Coating Liquid H19 for High Refractive Index Layer

A coating liquid H19 for a high refractive index layer was prepared, in the same manner as the coating liquid H1 for a high refractive index layer, except that the first metal oxide particles were prepared to be 4% by mass of $SiO_2$ as the coating amount of silicon-containing hydrated oxide with respect to titanium, oxide particles, and then used.

Production of Sample 19

Sample 19 was produced in the same manner as Sample 1, except that the coating liquid H19 for a high refractive index layer was used instead of the coating liquid H1 for a high refractive index layer, 21-layer simultaneous multilayer coating was respectively performed for both surfaces of polyethylene terephthalate film, and after drying, 25-layer simultaneous multilayer coating was respectively performed for both surfaces.

Comparative Example 1

Preparation of Coating Liquid H20 for High Refractive Index Layer

First, 28.9 parts of 20.0% by mass water-based dispersion liquid of titanium oxide sol containing rutile-type titanium, oxide microparticles (volume average particle diameter: 10 nm), 5.41 parts of 14.8% by mass aqueous solution of picolinic acid, and 3.92 parts of 2.1% by mass aqueous solution of lithium hydroxide were mixed to prepare a titanium oxide dispersion liquid H20.

Subsequently, to 10.3 parts of pure water, 130 parts of 1.0% by mass aqueous solution of tamarind seed gum as thickening polysaccharides, 10.3 parts of 5.0% by mass polyvinyl alcohol (manufactured by Kuraray Co., Ltd., PVA217), 17.3 parts of 14.8% by mass aqueous solution of picolinic acid, and 2.58 parts of 5.5% by mass aqueous solution of boric acid were sequentially added under stirring, and then 38.2 parts of titanium oxide dispersion liquid H2O obtained above was further added. Thereafter, 0.050 part of 5% by mass quaternary ammonium-based cationic surfactant (manufactured by NOF Corporation, Nissan Cation-2-DB-500E) was added as a surfactant. Pure water was added to prepare total 223 parts of coating liquid H20 for a high refractive index layer.

Preparation of Coating Liquid L3 for Low Refractive Index Layer 21 parts of 23.5% by mass aqueous solution of aluminum polychloride (manufactured by Taki Chemical Co., Ltd.; TAKIBINE #1500), 550 parts of 10% by mass aqueous solution of colloidal silica (manufactured by Nissan Chemical Industries, Ltd.; SNOWTEX OXS), 61 parts of 3.0% by mass aqueous solution of boric acid, and 4.75 parts of 2.1% by mass aqueous solution of lithium hydroxide were mixed and dispersed using a high pressure homogenizer disperser. After that, pure water was added to prepare total 1000 parts of colloidal silica dispersion liquid L3.

Subsequently, the obtained dispersion liquid L3 was heated to 45° C., and added with 100 parts of pure water and 575 parts of 4.0% by mass aqueous solution of polyvinyl alcohol (PVA235, manufactured by Kuraray Co., Ltd.) under stirring. Thereafter, 0.50 part of 5% by mass of quaternary ammonium-based cationic surfactant (manufactured by NOF Corporation, Nissan Cation-2-DB-500E) as a surfactant to prepare a coating liquid L3 for a low refractive index layer.

Production of Sample 20

Sample 20 was produced, in the same manner as Sample 1, except that the coating liquid H20 for a high refractive index layer was used instead of the coating liquid H1 for a high refractive index layer and the coating liquid L3 for a low refractive index layer was used, instead of the coating liquid L1 for a low refractive index layer.

Comparative Example 2

Preparation of Coating Liquid H21 for High Refractive Index Layer

A coating liquid H21 for a high refractive index layer was prepared in the same manner as the coating liquid H20 for a high refractive index layer, except that anatase-type titanium oxide particles were used when the first metal oxide particles were prepared, instead of the rutile-type titanium oxide particles.

Production of Sample 21

Sample 21 was produced in the same manner as Sample 1, except that the coating liquid H21 for a high refractive index layer was used instead of the coating liquid H1 for a high refractive index layer and the coating liquid L3 for a low refractive index layer was used instead of the coating liquid L1 for a low refractive index layer.

Comparative Example 3

Preparation of Coating Liquid H22 for High Refractive Index Layer

A coating liquid H22 for a high refractive index layer was prepared in the same manner as the coating liquid H20 for a high refractive index layer, except that 0.15 part by mass of catalyst (DX2400, manufactured by Shin-Etsu Chemical Co., Ltd.) was used as the first water-soluble polymer with respect to 1.5 parts by mass of ultraviolet curable binder (X-12-2400, manufactured by Shin-Etsu Chemical Co., Ltd.), instead, of polyvinyl alcohol (PVA217).

Preparation of Coating Liquid L4 for Low Refractive Index Layer

A coating liquid L4 for a low refractive index layer was prepared in the same manner as the coating liquid L3 for a low refractive index layer, except that 0.15 part by mass of catalyst (DX2400, manufactured by Shin-Etsu Chemical Co., Ltd.) was used as the second water-soluble polymer with respect to 1.5 parts by mass of ultraviolet curable binder (X-12-2400, manufactured by Shin-Etsu Chemical Co., Ltd.), instead of polyvinyl alcohol (PVA235).

Production of Sample 22

Sample 22 was produced in the same manner as Sample 1, except that the coating liquid H22 for a high refractive index layer was used instead of the coating liquid H1 for a high refractive index layer, the coating liquid L4 for a low refractive index layer was used instead of the coating liquid L1 for a low refractive index layer, and after multilayer coating, curing was performed using a UV-curing apparatus manufactured by EYE GRAPHICS Co., Ltd. (using a high-pressure mercury lamp) under atmosphere and at a curing condition of 400 mJ/cm$^2$.

The configurations of Samples of Examples and Comparative Examples are presented in Table 1.

TABLE 1

| | | | High refractive index layer | | | | |
|---|---|---|---|---|---|---|---|
| | | | | First metal oxide particles[1] | | | |
| | Sample No. | Coating liquid No. | First water-soluble polymer | Type | Coating amount of silica (% by mass) | Volume average particle diameter (nm) | Average primary particle diameter (nm) |
| Example 1 | 1 | H1 | PVA217 | $SiO_2$/rutile-type $TiO_2$ | 5 | 10 | 6.2 |
| Example 2 | 2 | H2 | PVA217 | $SiO_2$/rutile-type $TiO_2$ | 8 | 10 | 6.7 |
| Example 3 | 3 | H3 | PVA217 | $SiO_2$/rutile-type $TiO_2$ | 10 | 10 | 6.9 |
| Example 4 | 4 | H4 | PVA217 | $SiO_2$/rutile-type $TiO_2$ | 18 | 10 | 7.1 |
| Example 5 | 5 | H5 | PVA217 | $SiO_2$/rutile-type $TiO_2$ | 25 | 10 | 7.8 |
| Example 6 | 6 | H6 | PVA217 | $SiO_2$/rutile-type $TiO_2$ | 5 | 25 | 6.3 |
| Example 7 | 7 | H7 | PVA217 | $SiO_2$/rutile-type $TiO_2$ | 5 | 30 | 6.2 |
| Example 8 | 8 | H8 | PVA224 | $SiO_2$/rutile-type $TiO_2$ | 5 | 10 | 6.3 |
| Example 9 | 9 | H9 | PVA235 | $SiO_2$/rutile-type $TiO_2$ | 5 | 10 | 6.2 |
| Example 10 | 10 | H10 | PVA217 | $SiO_2$/anatase-type $TiO_2$ | 5 | 10 | 6.2 |
| Example 11 | 11 | H11 | Gelatin | $SiO_2$/rutile-type $TiO_2$ | 5 | 10 | 6.2 |
| Example 12 | 12 | H12 | Hydroxyethyl cellulose | $SiO_2$/rutile-type $TiO_2$ | 5 | 10 | 6.1 |
| Example 13 | 13 | H13 | Locust bean gum | $SiO_2$/rutile-type $TiO_2$ | 5 | 10 | 6.2 |
| Example 14 | 14 | H14 | PVA217 | $SiO_2$/rutile-type $TiO_2$ | 5 | 10 | 6.1 |
| Example 15 | 15 | H15 | PVA217 | $SiO_2$/rutile-type $TiO_2$ | 5 | 10 | 6.2 |
| Example 16 | 16 | H16 | PVA217 | $SiO_2$/rutile-type $TiO_2$ | 5 | 10 | 6.2 |
| Example 17 | 17 | H17 | PVA217 | $SiO_2$/rutile-type $TiO_2$ | 8 | 10 | 6.7 |
| Example 18 | 18 | H1 | PVA217 | $SiO_2$/rutile-type $TiO_2$ | 5 | 10 | 6.2 |
| Example 19 | 19 | H19 | PVA217 | $SiO_2$/rutile-type $TiO_2$ | 4 | 10 | 6.2 |
| Comparative Example 1 | 20 | H20 | PVA217 | Rutile-type $TiO_2$ | — | 10 | 6.4 |
| Comparative Example 2 | 21 | H21 | PVA217 | Anatase-type $TiO_2$ | — | 10 | 6.3 |
| Comparative Example 3 | 22 | H22 | Ultraviolet curable binder | Rutile-type $TiO_2$ | — | 10 | 6.4 |

| | | Low refractive index layer | | | |
|---|---|---|---|---|---|
| | Coating liquid No. | Second water-soluble polymer | Second metal oxide particles | Refractive index difference[2] Δn | Lamination |
| Example 1 | L1 | PVA235 JP45 | $SiO_2$ | 0.45 | Only one surface is 27-layered |
| Example 2 | L1 | PVA235 JP45 | $SiO_2$ | 0.44 | Only one surface is 27-layered |
| Example 3 | L1 | PVA235 JP45 | $SiO_2$ | 0.43 | Only one surface is 27-layered |
| Example 4 | L1 | PVA235 JP45 | $SiO_2$ | 0.42 | Only one surface is 27-layered |
| Example 5 | L1 | PVA235 JP45 | $SiO_2$ | 0.40 | Only one surface is 27-layered |

TABLE 1-continued

| | | | | | |
|---|---|---|---|---|---|
| Example 6 | L1 | PVA235 JP45 | SiO$_2$ | 0.45 | Only one surface is 27-layered |
| Example 7 | L1 | PVA235 JP45 | SiO$_2$ | 0.45 | Only one surface is 27-layered |
| Example 8 | L1 | PVA235 JP45 | SiO$_2$ | 0.45 | Only one surface is 27-layered |
| Example 9 | L1 | PVA235 JP45 | SiO$_2$ | 0.45 | Only one surface is 27-layered |
| Example 10 | L1 | PVA235 JP45 | SiO$_2$ | 0.43 | Only one surface is 27-layered |
| Example 11 | L1 | PVA235 JP45 | SiO$_2$ | 0.41 | Only one surface is 25-layered |
| Example 12 | L1 | PVA235 JP45 | SiO$_2$ | 0.45 | Only one surface is 23-layered |
| Example 13 | L1 | PVA235 JP45 | SiO$_2$ | 0.45 | Only one surface is 27-layered |
| Example 14 | L2 | PVA235 JP45 | SiO$_2$ | 0.41 | Only one surface is 27-layered |
| Example 15 | L1 | PVA235 JP45 | SiO$_2$ | 0.25 | Only one surface is 27-layered |
| Example 16 | L1 | PVA235 JP45 | SiO$_2$ | 0.37 | Only one surface is 27-layered |
| Example 17 | L1 | PVA235 JP45 | SiO$_2$ | 0.43 | Only one surface is 42-layered |
| Example 18 | L1 | PVA235 JP45 | SiO$_2$ | 0.45 | Both lamination surfaces each are 21-layered |
| Example 19 | L1 | PVA235 JP45 | SiO$_2$ | 0.45 | Both lamination surfaces each are 46-layered |
| Comparative Example 1 | L3 | PVA235 | SiO$_2$ | 0.46 | Only one surface is 27-layered |
| Comparative Example 2 | L3 | PVA235 | SiO$_2$ | 0.46 | Only one surface is 27-layered |
| Comparative Example 3 | L4 | Ultraviolet curable binder | SiO$_2$ | 0.46 | Only one surface is 27-layered |

Note)
1. In the item of "first metal oxide particles", "SiO$_2$/rutile-type TiO$_2$" or "SiO$_2$/anatase-type TiO$_2$" of Examples means that particles formed by coating rutile-type titanium oxide particles or anatase-type titanium oxide particles with silicon-containing hydrated oxide are used as the first metal oxide particles.
2. "Refractive index difference" means a value of "refractive index of the high refractive index layer – refractive index of the low refractive index layer".

{Evaluation of Near-Infrared Shielding Film}

The following performance evaluation was carried out for each near-infrared shielding film produced in the above.

<Measurement of Single-Layer Refractive Index of Each Layer>

A sample prepared by single-layer coating of subject layer (high refractive index layer and low refractive index layer) for measuring the refractive index on a substrate was produced, and the refractive index of each of the high refractive index layer and the low refractive index layer was measured according to the following method.

U-4000 (manufactured by Hitachi Ltd.) was used as a spectrophotometer. After a roughing treatment was conducted on the back surface opposite to the measurement side of each sample, a light absorbing treatment was carried out using a black spray to prevent reflection from the back surface. The reflectance in visible light region (400 nm to 700 nm) was measured under 5-degree mirror reflection to obtain the refractive index.

As a result obtained by measuring the refractive index of each layer according to the above-described method, it was confirmed that all refractive index differences between the high refractive index layers and the low refractive index layers were 0.1 or more, <Measurement of Visible Light Transmittance and Near-Infrared Transmittance>

By using the above spectrophotometer (an integrating sphere was used, manufactured by Hitachi Ltd., U-4000), the transmittance of each of Samples 1 to 22 of the near-infrared shielding film was measured in the region of 300 nm to 2000 nm. The transmittance at 550 nm was used as visible light transmittance, and the transmittance at 1200 nm was used as near-infrared transmittance.

<Test of Durability Against Change in Temperature and Humidity>

Samples 1 to 22 of the near-infrared shielding film were kept at a high temperature and high humidity condition at a temperature of 40° C. and a humidity of 80% for four hours, after that, the condition was transferred to an environment at a temperature of 20° C. and a humidity of 50% over two hours, further kept for four hours in the same state, and again brought back to the state at a temperature of 40° C. and a humidity of 80% over two hours. Single cycle consists of those whole processes and durability test against changes in temperature and humidity was performed with six cycles in total. After that, the visible light transmittance and the near-infrared transmittance were obtained again as a result after the durability test in the same manner as described above. Each result is presented in Table 2.

<Change Rate Before and after Test of Durability Against Change in Temperature and Humidity>

Change rates before and after the durability test of the visible light transmittance and the near-infrared transmittance were calculated by using the following formulae. Results are presented in Table 2.

Change rate of visible light transmittance(%)=|visible light transmittance before durability test(%)−visible light transmittance after durability test(%)|/(visible light transmittance before durability test(%))×100

Change rate of near-infrared transmittance(%)=|near-infrared transmittance before durability test(%)−near-infrared transmittance after durability test(%)|/(near-infrared transmittance before durability test (%))×100    [Equation 2]

<Measurement of Film Flexibility>

Samples 1 to 22 of the near-infrared shielding film were cut into a size of 150 mm×200 mm and put into ovens of 80° C. and 120° C. for 10 minutes. The states of film surfaces were visually evaluated. Results are presented in Table 2.

◯: Cracks are not observed at 120° C.

Δ: Cracks are not observed at 80° C., but cracks are partially observed at 120° C.

x: Cracks are observed, at 80° C.

TABLE 2

|  | Sample No. | Visible light transmittance | | | Near-infrared transmittance | | | Flexibility |
|---|---|---|---|---|---|---|---|---|
|  |  | Before durability test (%) | After durability test (%) | Change rate (%) | Before durability test (%) | After durability test (%) | Change rate (%) |  |
| Example 1 | 1 | 90 | 86 | 4.4 | 9 | 11 | 22.2 | ◯ |
| Example 2 | 2 | 89 | 86 | 3.4 | 9 | 12 | 33.3 | ◯ |
| Example 3 | 3 | 88 | 84 | 4.6 | 12 | 16 | 33.3 | ◯ |
| Example 4 | 4 | 89 | 85 | 4.5 | 17 | 21 | 23.5 | ◯ |
| Example 5 | 5 | 86 | 83 | 3.5 | 21 | 26 | 23.8 | ◯ |
| Example 6 | 6 | 75 | 72 | 4.0 | 14 | 19 | 35.7 | ◯ |
| Example 7 | 7 | 68 | 62 | 8.8 | 15 | 20 | 33.3 | ◯ |
| Example 8 | 8 | 89 | 85 | 4.5 | 7 | 9 | 28.6 | ◯ |
| Example 9 | 9 | 88 | 85 | 3.4 | 6 | 8 | 33.3 | ◯ |
| Example 10 | 10 | 87 | 80 | 8.0 | 9 | 11 | 22.2 | ◯ |
| Example 11 | 11 | 85 | 80 | 5.9 | 14 | 18 | 28.6 | ◯ |
| Example 12 | 12 | 84 | 79 | 6.0 | 15 | 20 | 33.3 | ◯ |
| Example 13 | 13 | 83 | 78 | 6.0 | 16 | 22 | 37.5 | ◯ |
| Example 14 | 14 | 85 | 87 | 2.4 | 11 | 13 | 18.2 | ◯ |
| Example 15 | 15 | 88 | 84 | 4.5 | 13 | 15 | 15.4 | ◯ |
| Example 16 | 16 | 88 | 86 | 2.3 | 12 | 14 | 16.7 | ◯ |
| Example 17 | 17 | 87 | 86 | 1.1 | 8 | 9 | 12.5 | ◯ |
| Example 18 | 18 | 89 | 88 | 1.1 | 7 | 8 | 14.3 | ◯ |
| Example 19 | 19 | 90 | 89 | 1.1 | 6 | 7 | 16.7 | ◯ |
| Comparative Example 1 | 20 | 50 | 43 | 14.0 | 30 | 35 | 16.7 | Δ |
| Comparative Example 2 | 21 | 51 | 32 | 37.3 | 29 | 38 | 31.0 | Δ |
| Comparative Example 3 | 22 | 49 | 35 | 28.6 | 31 | 37 | 19.4 | X |

It is desirable that the near-infrared shielding film have high visible light transmittance and low near-infrared transmittance. Moreover, it is more desirable that the near-infrared shielding film have durability, that is, a small change rate in durability before and after the durability test. From, the results presented in Table 2, it is found that all of Samples 1 to 19 of the near-infrared shielding film according to the present invention have higher visible light transmittance and more effective near-infrared shielding properties compared to Comparative Samples 20 to 22. Moreover, it is found that the near-infrared shielding film have high visible light transmittance and low near-infrared transmittance even after repeated changes in temperature and humidity, that is, is excellent in durability. In addition, it is found that all of Samples 1 to 19 of the near-infrared shielding film according to the present invention are excellent in film flexibility.

{Production of Near-Infrared Shielding Body}

<Production of Near-Infrared Shielding Bodies 1 to 19>

Near-infrared shielding bodies 1 to 19 were produced by pasting each of the near-infrared shielding films of Samples 1 to 19 that have been produced in Examples on a transparent acrylate resin plate with a thickness of 5 mm and a size of 20 cm×20 cm by adhering each film with acryl adhesives.

<Evaluation of Near-Infrared Shielding Body>

It was confirmed that the near-infrared shielding bodies 1 to 19 of the present invention produced in the above had excellent near-infrared shielding properties by using the near-infrared shielding film of the present invention.

The present application is based on Japanese Patent Application No. 2011-225156 filed on Oct. 12, 2011, and its disclosure is incorporated herein by reference in its entirety.

What is claimed is:

1. A near-infrared shielding film comprising an optical interference film formed by alternately laminating a high refractive index layer containing a first water-soluble polymer and first metal oxide particles and a low refractive index layer containing a second water-soluble polymer and second metal oxide particles, on a substrate,
   wherein the first metal oxide particles are titanium oxide particles coated with silicon-containing hydrated oxide, and
   wherein, as a coating amount of the silicon-containing hydrated oxide on the first metal oxide particles, $SiO_2$ is 3 to 30% by mass with respect to the titanium oxide particle.

2. The near-infrared shielding film according to claim 1, wherein the first metal oxide particles have an average primary particle diameter of 2 to 31 nm.

3. The near-infrared shielding film according to claim 1, wherein the first metal oxide particles include a rutile-type titanium oxide.

4. The near-infrared shielding film according to claim 1, wherein, as a coating amount of the silicon-containing hydrated oxide on the first metal oxide particles, $SiO_2$ is 3 to 10% by mass with respect to the titanium oxide particle.

5. The near-infrared shielding film according to claim 1, wherein the first and the second water-soluble polymers are polyvinyl alcohol.

6. The near-infrared shielding film according to claim 1, wherein at least one layer of the high refractive index layer and the low refractive index layer contains at least one of boric acid and a salt thereof, and borax.

7. The near-infrared shielding film according to claim 1, wherein a refractive index difference between the high refractive index layer and the low refractive index layer is 0.3 or more.

8. The near-infrared shielding film according to claim 1, wherein a total number of layers of the high refractive index layer and the low refractive index layer per one surface of the substrate is in a range of 100 layers or less and 12 layers or more.

9. The near-infrared shielding film according to claim 1, wherein the near-infrared shielding film has a transmittance of the visible light region of 50% or more, prescribed in JIS R3106-1998, and a region with a reflectance of more than 50% in a region with a wavelength of 900 nm to 1,400 nm.

10. The near-infrared shielding film according to claim 1, wherein the second metal oxide particles are silica.

11. A near-infrared shielding body being formed by being provided with the near-infrared shielding film set forth in claim 1 on at least one surface of a substrate.

12. The near-infrared shielding body according to claim 11, wherein the near-infrared shielding body is a laminated glass formed by sandwiching the near-infrared shielding film between a glass and the substrate.

13. The near-infrared shielding film according to claim 1, wherein a visible light transmittance of the near-infrared shielding film is 62% or more.

* * * * *